(12) United States Patent
Demonget et al.

(10) Patent No.: US 12,207,130 B2
(45) Date of Patent: Jan. 21, 2025

(54) SYSTEMS AND METHODS FOR NETWORK DESIGN AND CONFIGURATION BASED ON USER-LEVEL USAGE MODELING

(71) Applicant: Verizon Patent and Licensing Inc., Basking Ridge, NJ (US)

(72) Inventors: Sylvestre Demonget, Millburn, NJ (US); Anand J. Shah, Parsippany, NJ (US); David Albert Rossetti, Randolph, NJ (US); Madhusudan Mandyam Bheemarayan, Hillsborough, NJ (US); Anush Gift Isaac, Lewisville, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 350 days.

(21) Appl. No.: 17/819,996

(22) Filed: Aug. 16, 2022

(65) Prior Publication Data

US 2024/0064563 A1    Feb. 22, 2024

(51) Int. Cl.
*H04W 24/08* (2009.01)
*H04W 28/02* (2009.01)

(52) U.S. Cl.
CPC ....... *H04W 28/0289* (2013.01); *H04W 24/08* (2013.01); *H04W 28/0226* (2013.01)

(58) Field of Classification Search
CPC ......... H04W 28/0289; H04W 28/0226; H04W 24/08; H04W 24/02
See application file for complete search history.

(56) References Cited

U.S. PATENT DOCUMENTS

| | | | |
|---|---|---|---|
| 11,134,402 B1 * | 9/2021 | Boyapati | H01M 10/48 |
| 2015/0281980 A1 * | 10/2015 | Zhou | H04W 28/0268 |
| | | | 370/254 |
| 2016/0127943 A1 * | 5/2016 | Shaw | H04W 28/0231 |
| | | | 370/230 |
| 2016/0330099 A1 * | 11/2016 | Koo | H04L 43/0894 |
| 2024/0223486 A1 * | 7/2024 | Holland | H04W 4/021 |

* cited by examiner

*Primary Examiner* — Jae Y Lee
*Assistant Examiner* — Hector Reyes

(57) ABSTRACT

A system described herein may identify sets of seed parameters that are each associated with a respective User Equipment ("UE") of a group of UEs. The system may generate, based on the seed parameters for each UE, a respective set of UE usage metrics for each UE, and may generate a set of aggregate UE usage metrics based on the generated sets of UE usage metrics. The system may compare the aggregate UE usage metrics to a measure of network capacity; determine an amount of time that a measure of UE usage exceeds the measure of network capacity; determine that the amount of time, that the measure of UE usage exceeds the measure of network capacity, exceeds a threshold amount of time; and modify network configuration parameters based on determining that the amount of time, that UE usage exceeds the network capacity, exceeds the threshold amount of time.

20 Claims, 13 Drawing Sheets

SYSTEMS AND METHODS FOR NETWORK DESIGN AND CONFIGURATION BASED ON USER-LEVEL USAGE MODELING

BACKGROUND

Wireless networks provide wireless connectivity to User Equipment ("UEs"), such as mobile telephones, tablets, Internet of Things ("IoT") devices, or the like. Wireless networks may allocate radio frequency ("RF") resources to particular UEs or groups of UEs in order to satisfy demand for services at a given time or location, Quality of Service ("QoS") requirements, or other considerations. Some networks may provide for shared access to RF resources, such as for different private networks, groups of UEs, etc. using the same physical network infrastructure (e.g., base stations, radios, antennas, etc.) for wireless connectivity.

DETAILED DESCRIPTION OF EXAMPLE EMBODIMENTS

The following detailed description refers to the accompanying drawings. The same reference numbers in different drawings may identify the same or similar elements.

Figure 1:
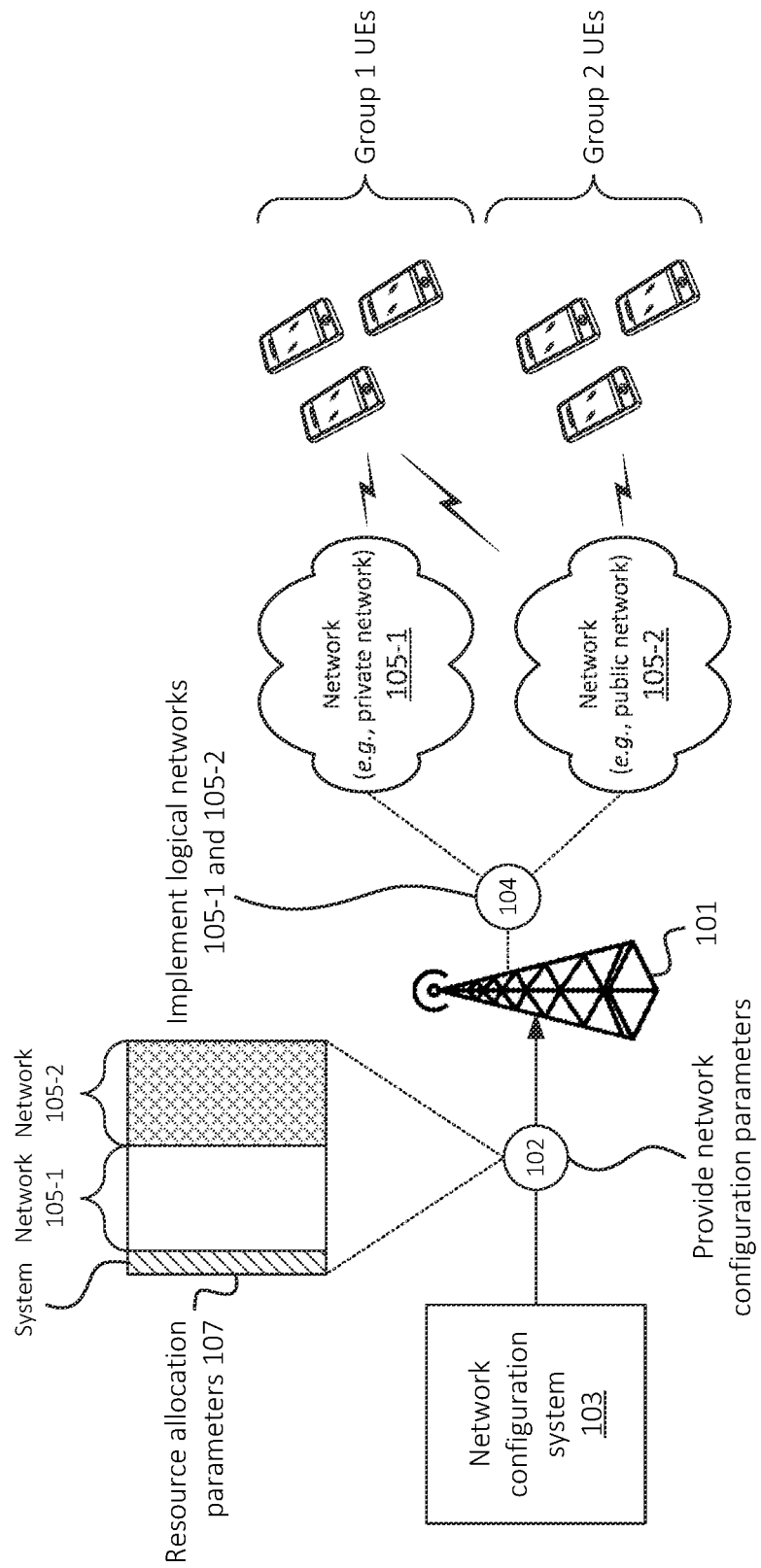
FIG. 1 illustrates an example configuration of multiple networks that are implemented using shared hardware radio equipment and resources.

Wireless networks, such as Long-Term Evolution ("LTE") networks, Fifth Generation ("5G") networks, or the like, may be associated with configurable resource allocation parameters, such that different UEs, groups of UEs, private networks, or other entities may receive differentiated wireless service via one or more RANs of the wireless networks. For example, as shown in FIG. 1, base station 101 may receive (at 102) network configuration parameters (e.g., from network configuration system 103 and/or from some other source), and may use the network configuration parameters to implement (at 104) one or more logical networks, such as networks 105-1 and 105-2. Networks 105-1 and 105-2 may both be "private" networks, and/or one or more of network 105-1 and/or 105-2 may be a "public" network. A "private" network may refer, for example, to a network to which access is restricted to particular UEs, users, device types, or other groups or categories. A "public" network may refer, for example, to a network to which access is not restricted in such a manner. For example, in some implementations, all UEs or users associated with a network operator associated with base station 101 (e.g., an owner or operator of base station 101) may have access to the public network, while only a subset of such UEs (and/or different UEs) may have access to the private network.

In some embodiments, each network 105 may include, may be communicatively coupled to, and/or may otherwise be associated with one or more core networks. For example, in some embodiments, network 105-1 may be or may include a first core network (e.g., a core network associated with one particular network operator), while network 105-2 may be or may include a second core network (e.g., a core network associated with a different particular network operator, or a different core network associated with the same particular network operator). In some embodiments, base station 101 and/or networks 105 may implement one or more standards, application programming interfaces ("APIs"), protocols, etc. such as a Multi-Operator Core Network ("MOCN") standard, that facilitate the coupling of a particular base station 101 or other radio equipment with different core networks.

For example, a first group of UEs (e.g., "Group 1 UEs") may have access to network 105-1, and a second group of UEs (e.g., "Group 2 UEs") may not have access to network 105-1. In such an example, network 105-1 may be a private network to which Group 1 UEs have access, where such access is based on UE identifiers (e.g., Subscription Permanent Identifier ("SUPI") values, International Mobile Station Equipment Identity ("IMEI") values, Mobile Directory Numbers ("MDNs"), or other suitable identifiers), device type, and/or other suitable criteria or access control mechanisms. Similarly, network 105-2 may be a network to which Group 2 UEs have access, while Group 1 UEs are unable (e.g., are not authorized) to access network 105-2. As another example, network 105-1 may be a private network that Group 1 UEs are able to access and Group 2 UEs are not able to access, while network 105-2 may be a public network that Group 1 UEs and Group 2 UEs are able to access. For example, in the event that network 105-1 becomes congested or otherwise does not allow Group 1 UEs to connect to network 105-1, Group 1 UEs may connect to network 105-2.

In some implementations, network 105-1 may be a private network with a particular set of Service Level Agreements ("SLAs"), QoS parameters, priority levels, etc., via which performance of traffic or services provided via network 105-1 may be higher (e.g., lower latency, higher throughput, etc.) than performance provided via network 105-2. For example, network 105-2 may be a public network, may be associated with "best effort" service, and/or may otherwise be associated with a lower level of performance than network 105-1.

The network configuration parameters received (at 102) from network configuration system 103 may include resource allocation parameters 107, which may include, for example, parameters relating to discrete amounts of RF resources (e.g., resource elements ("REs"), Physical Resource Blocks ("PRBs"), etc.) or other resources to allocate to respective networks 105-1 and 105-2. For example, resource allocation parameters 107 may specify a first set of resources for system communications (e.g., broadcasts such as System Information Blocks ("SIBs"), Master Information Blocks ("MIBs"), etc.), a second set of resources for network 105-1, and a third set of resources for network 105-2. In this manner, network configuration system 103 may specify the amount of resources to use, and/or other configuration parameters, of networks 105-1 and 105-2 by providing resource allocation parameters 107. In some embodiments, network configuration system 103 may provide additional or different parameters that base station 101 may use to implement networks 105-1 and 105-2 in addition to or in lieu of resource allocation parameter 107, such as beamforming parameters, queue weight parameters, and/or other parameters. Network configuration system 103 may provide different resource allocation parameters 107 to base station 101 in order to dynamically adjust configuration parameters of networks 105-1 and 105-2 based on factors such as expected or actual demand for service via base station 101, comparison of performance metrics (e.g., as reported by UEs connected to base station 101) to SLAs or other QoS parameters, and/or other factors.

For example, in accordance with some embodiments as discussed below, network configuration system 103 may set, modify, adjust, etc. resource allocation parameters 107 in order to ensure that a given network 105 has sufficient throughput (e.g., RF resource capacity) to accommodate traffic sent to and/or received from a given set of UEs for at least a threshold proportion of time (e.g., at least 90% of the time, at least 95% of the time, etc.). In this manner, the user experience of UEs that access network 105 may be provided in accordance with SLAs or QoS parameters associated with network 105, for at least the threshold proportion of time. Further, resources of base station 101 (or other network infrastructure that implements network 105) may be efficiently allocated, such that excess resources are not allocated for network 105 when such resources are not needed to meet demand. Further, while examples are provided herein in the context of the adjustment of the allocation of RF resources of a RAN of a wireless network, similar concepts may apply to the adjustment of configuration parameters of other portions of a network, such as queuing parameters or other QoS treatment parameters of a core network, a backhaul network that carries traffic between a RAN and the core network, etc.

Figure 2:
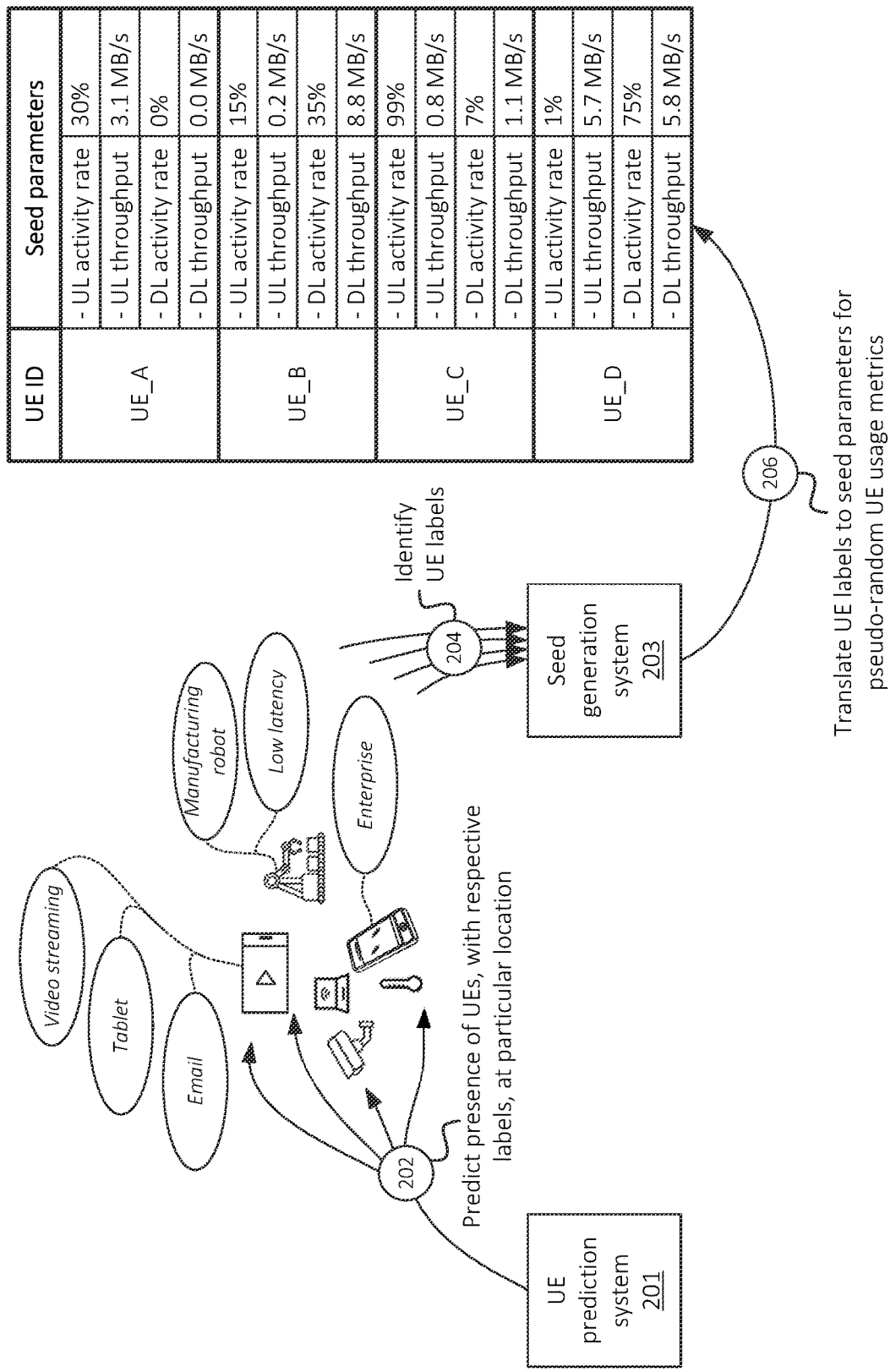
FIG. 2 illustrates an example of identifying seed parameters for generating a set of per-UE usage metrics for a set of UEs at a particular location, in accordance with some embodiments.

As shown in FIG. 2, for example, UE prediction system 201 may predict (at 202) the presence of a particular set of UEs at a particular location. UE prediction system 201 may, for example, utilize artificial intelligence/machine learning ("AI/ML") techniques or other suitable modeling techniques to predict the presence of the particular set of UEs at the particular location. Generally, such predictions may be based on daily occurrences such as commutes between residences and workplaces of users of such UEs, seasonal occurrences such as holiday-based events, intermittent occurrences such as scheduled events (e.g., concerts, sports games, etc.), and/or other factors. Additionally, or alternatively, the presence of UEs at the location may be predicted or identified based on actual data (e.g., location data provided by a network operator or other entity) indicating that the UEs will be, or are presently, located at the particular location. The UEs may include, may be communicatively coupled to, or may be integrated in various types of devices, such as mobile telephones, autonomous vehicles, manufacturing robots, drones, laptops, IoT devices, sensors, and/or other types of devices. The particular location may be, may include, and/or may otherwise correspond to a particular geographical location, a particular geographical region, a coverage area of a particular base station 101, a sector of a RAN, a cell, or other location or region associated with a given wireless network.

While location is used as an example of a group of UEs that may be specified, predicted, etc., in practice, other criteria or parameters may be used to identify a group of UEs for which operations described herein are performed. For example, in addition to or in lieu of location, factors such as SLAs (e.g., a group of UEs associated with a particular set of SLAs), QoS parameters, device types (e.g., mobile phone, IoT device, sensor, wearable device, etc.), traffic or service type (e.g., voice call traffic, augmented reality application traffic, streaming content traffic, surveillance video, mission-critical video, etc.), category (e.g., manufacturing robot, autonomous vehicle, etc.), user group, etc. may be used to predict (at 202) and/or otherwise identify a particular set of UEs.

The set of UEs may each be associated with one or more labels, categories, tags, etc. (referred to herein simply as "labels" for the sake of brevity). The labels may generally indicate attributes, usage characteristics, etc. of the UEs and/or of users associated with such UEs. The identification of the labels may be performed using AI/ML techniques, based on information provided by a network operator or other entities, based on manually provided input (e.g., in a testing or simulation environment), and/or in some other manner.

As shown, a first example UE may be associated with the labels "video streaming," "tablet," and "email," which may indicate that this UE is commonly used for video streaming and email traffic, and that a device type of the UE is a tablet. As another example, a second UE may be associated with the labels "manufacturing robot" and "low latency," which may indicate that this UE is associated with (e.g., is commonly located within, or is integrated in) a manufacturing robot, and that this UE is associated with low latency traffic (e.g., one or more SLAs or QoS parameters indicate one or more maximum latency thresholds for traffic associated with the UE). As further shown, a third example UE may be associated with the label "Enterprise," which may indicate that this UE is associated with a particular group or category that is associated with a particular set of SLAs or QoS parameters. For example, a particular corporation or other entity may subscribe to such SLAs or QoS parameters, and may provide UEs to employees, where such UEs receive service according to the subscribed SLAs or QoS parameters. While some examples of labels are provided above, in practice, other labels may be used.

In some embodiments, the quantity of UEs (or groups of UEs) associated with a particular set of labels, parameters, etc., may be predicted (at 202) or otherwise specified. For example, a group of ten UEs with a "video streaming" label and a "tablet" label (i.e., having both labels, and thus the same set of labels) may be predicted or specified, a group of seven UEs with a "manufacturing robot" label may be predicted or specified, and so on. In this manner, an allocation ratio of each particular label or set of labels may be identified. That is, if 100 UEs are predicted (at 202), including 20 UEs with a "video streaming" label and a "tablet" label, then the allocation ratio for UEs with a "video streaming" label and a "tablet" label may be 20% in this example.

In some embodiments, the UEs may be UEs associated with a particular network 105 (e.g., a private network). In such embodiments, different sets of UEs may be identified with respect to the same location, and operations described herein may be performed for each network 105 that is implemented at the same location. In this manner, SLAs, QoS parameters, etc. may be enforced, verified, etc. for private networks, such as private networks that are implemented using shared hardware resources (e.g., shared with public networks or other private networks in the same location).

Seed generation system 203 may identify (at 204) the labels associated with the set of UEs, and may translate (at 206) the UE labels to seed parameters for a pseudo-random generation of UE usage metrics. For example, the labels may be unstructured data or may not otherwise be directly associated with seed parameters used by a device or system that is able to generate usage metrics for UEs in a pseudo-random manner (e.g., pseudo-random UE usage generator 301, as discussed below), and seed generation system 203 may determine parameters that are able to be used by such a device or system. The translation of labels to seed parameters may allow for a user-friendly mechanism whereby a user, such as a network operator or other entity, may easily specify characteristics, attributes, descriptors, etc. of UEs that are located at, or are predicted or expected to be located at, a given location without requiring such user to have knowledge of particular seed parameters or how to accurately specify values for such seed parameters. Further, the translation of labels to seed parameters may allow for AI/ML techniques to be used to identify labels, without requiring the need to configure or train such AI/ML techniques to also account for how such labels relate to seed parameters.

The seed parameters may be defined by one or more APIs, protocol, specifications, etc. associated with pseudo-random UE usage generator 301 and/or some other suitable device or system. In this example, the seed parameters are uplink ("UL") activity rate, UL throughput, downlink ("DL") activity rate, and DL throughput. In practice, the seed parameters may include additional, fewer, and/or different metrics. Seed parameters relating to "throughput" may refer to an average amount of throughput sent (e.g., UL throughput) or received (e.g., DL throughput) by a given UE over given span of time (e.g., one minute, one hour, one day, etc.). Additionally, or alternatively, seed parameters relating to throughput may refer to an average amount of throughput sent or received by the UE when the UE is active, and may omit or exclude a measure of throughput when the UE is inactive.

For example, assume that the UE actively sends or receives traffic via a network for one minute, and then does not send or receive traffic for four minutes. Additionally, or alternatively, the throughput of the UE during the one minute may be above a threshold, while the throughput of the UE during the four minutes may be below a threshold (e.g., relatively minimal or zero throughput). The average throughput in these example may be based on how much traffic is sent or received by the UE during the one minute of sending or receiving, and may not be based on the four minutes. That is, the average throughput in such situations may be x/[1 minute] instead of x/[5 minutes], where x is the amount of traffic sent and/or received by the UE. While the above examples refer to "average" metrics, in practice, other values such as median, maximum, minimum, etc. may be used.

Seed parameters relating to "activity rate" may refer to a proportion of time that a given UE is active (e.g., is sending or receiving traffic, and/or is sending or receiving traffic above a threshold throughput). For example, a UE that sends or receives traffic above a threshold throughput for one minute out of a five-minute window may have an activity rate of 20%.

In some embodiments, activity rate and/or throughput may be specified in terms of UL values and DL values. For example, a UL activity rate of 15% and a UL throughput of 0.2 Megabytes per second ("MB/s") for a given UE may indicate that the UE outputs traffic 15% of the time at a rate of 0.2 MB/s, and a DL activity rate of 35% and DL throughput of 8.8 MB/s may indicate that the same UE receives traffic 35% of the time at a rate of 8.8 MB/s. In practice, activity rate, throughput, and/or other metrics may indicate different usage patterns than the examples provided above.

In some embodiments, additional or different parameters may be used in addition to or in lieu of the example seed parameters discussed above. For example, in some embodiments, delay sensitivity (e.g., "real time," "non-real time," etc.), average or median data burst size (e.g., relating to an amount of data that a given UE sends and/or receives in a given "burst"), data burst size variance or standard deviation, average or median data burst interval, data burst interval variance or standard deviation, average or median data burst duration, data burst duration variance or standard deviation, and/or other suitable parameters.

Further, while examples herein are discussed as metrics on a "per-UE" basis, in some embodiments, similar concepts may be performed with respect to metrics, seeds, etc. associated with UE groups, categories, etc. For example, while FIG. 2 shows a particular set of seed parameters for a particular UE having the identifier "UE A," in practice, such seed parameters may be derived from or otherwise associated with labels or other attributes associated with a particular group of UEs (e.g., seed parameters for UEs associated with a "manufacturing robot" group, seed parameters for UEs associated with a "mobile telephone" group, etc.).

Figure 3A:
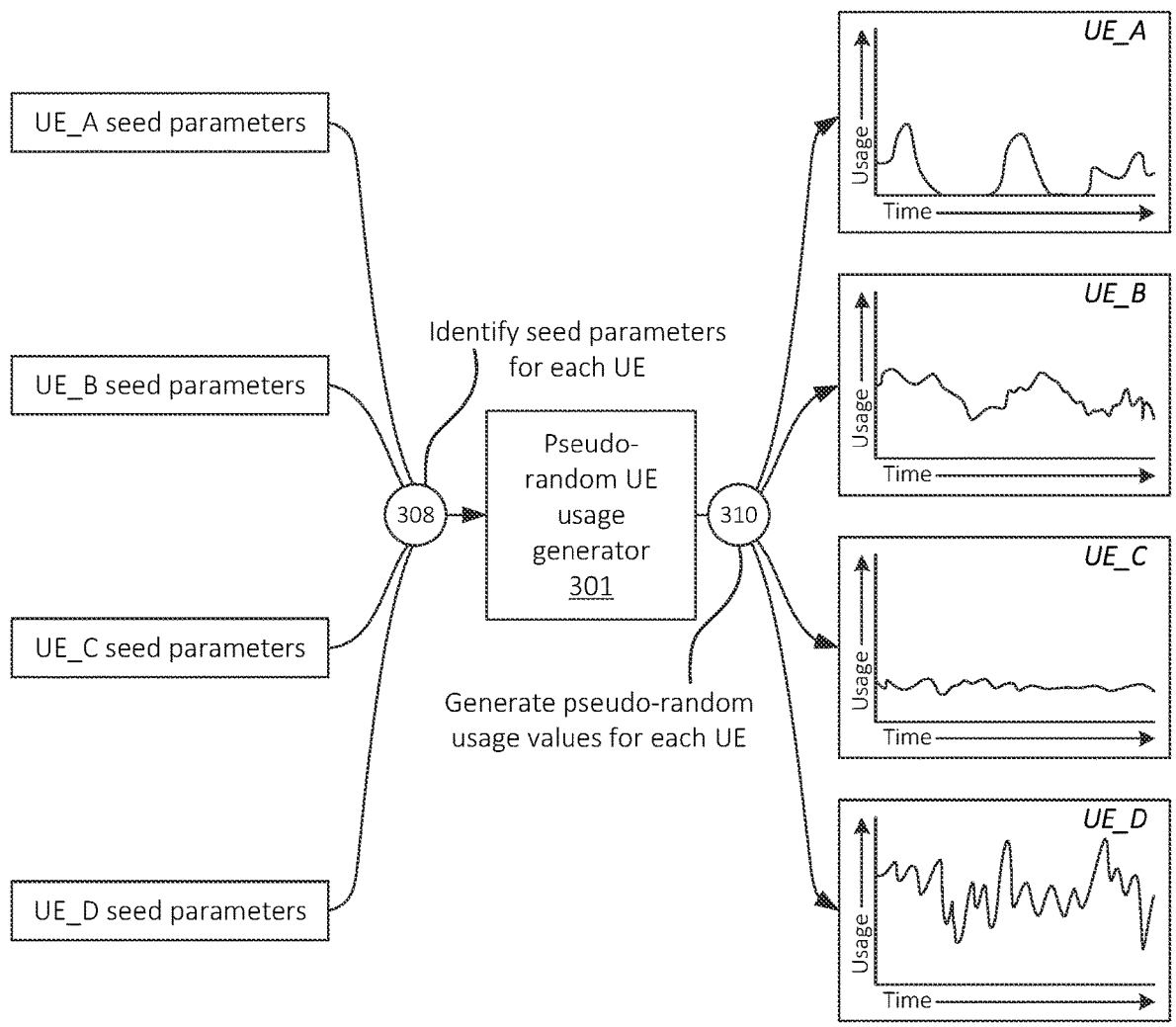
FIGS. 3A and 3B illustrate examples of generating per-UE usage metrics as a function of time based on respective seed parameters, in accordance with some embodiments.

As shown in FIG. 3A, pseudo-random UE usage generator 301 may identify (at 308) the seed parameters received from seed generation system 203 and/or some other source, and may generate (at 310) respective sets of pseudo-random usage metrics associated with each UE for which seed parameters were provided. For example, pseudo-random UE usage generator 301 may utilize AI/ML techniques or other suitable modeling techniques to generate (e.g., simulate) throughput metrics as a function of time for each UE. Pseudo-random UE usage generator 301 may use the seed parameters as inputs to one or more random number generators, models, algorithms, etc. that provide the usage metrics (e.g., as determined based on the seed parameters) as output.

As shown, for example, pseudo-random UE usage generator 301 may generate different sets of pseudo-random usage metrics based on different sets of seed parameters associated with the different UEs discussed above. FIG. 3A illustrates the sets of pseudo-random usage metrics as graphs. In practice, the pseudo-random usage metrics may be stored and/or outputted by pseudo-random UE usage generator 301 as one or more charts, tables, or other suitable data structures. In some embodiments, pseudo-random UE usage generator 301 may generate separate sets of usage metrics for each UE for UL and DL metrics. In some embodiments, pseudo-random UE usage generator 301 may generate a composite or combined set of usage metrics for each UE that is based on both UL and DL metrics. In some embodiments, pseudo-random UE usage generator 301 may generate usage metrics for each UE for only UL metrics or only DL metrics.

Figure 3B:
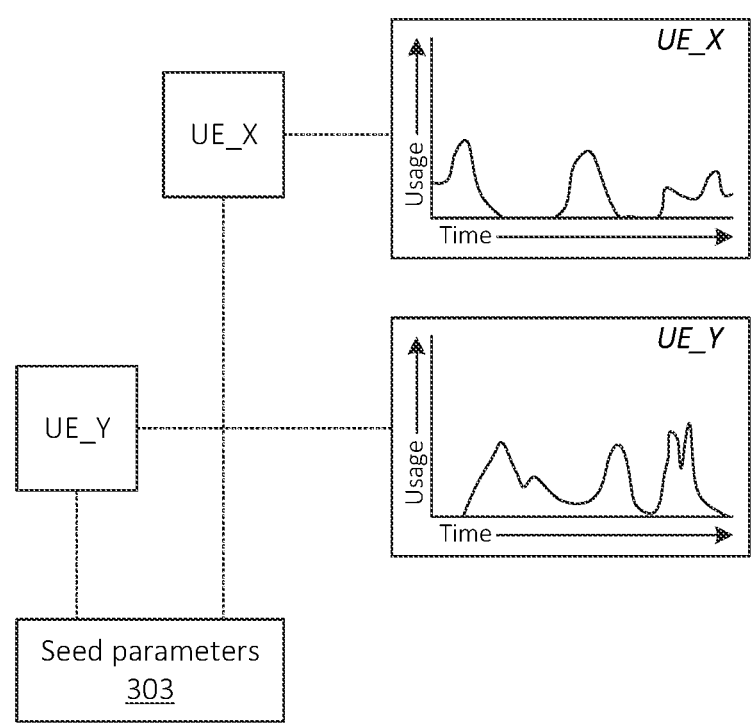

As noted above, multiple UEs may be associated with the same labels, seed parameters, etc. Thus, when generating (at 310) per-UE usage metrics, pseudo-random UE usage generator 301 may generate different sets of per-UE usage metrics for different UEs that are associated with the same labels, seed parameters, etc. For example, as shown in FIG. 3B, assume that two example UEs (UE_X and UE_Y) are associated with the same seed parameters 303, which may have been generated based on these UEs having the same label(s). Although UE_X and UE_Y are associated with the same seed parameters 303, and as shown in FIG. 3B, pseudo-random UE usage generator 301 may generate different sets of UE usage metrics for each one of these UEs.

Figure 4:
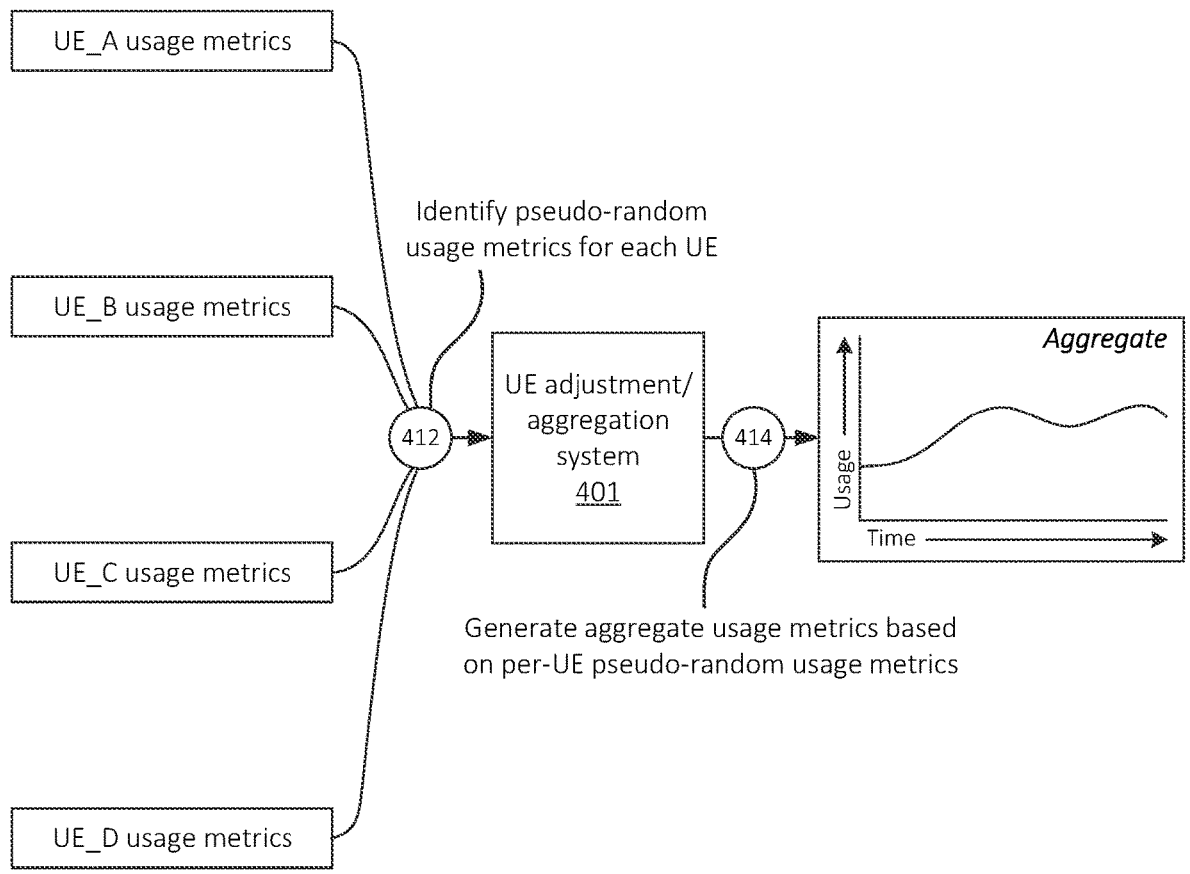
FIG. 4 illustrates an example of generating aggregate UE usage metrics based on per-UE sets of pseudo-random usage metrics, in accordance with some embodiments.

As shown in FIG. 4, UE adjustment/aggregation system 401 may identify (at 412) the usage metrics associated with each UE, which may include sets of pseudo-random usage metrics, as generated by pseudo-random UE usage generator 301 and/or other UE usage metrics generated by and/or received from some other device or system. UE adjustment/aggregation system 401 may generate (at 414) aggregate usage metrics based on the per-UE usage metrics (e.g., the per-UE pseudo-random usage metrics generated by pseudo-random UE usage generator 301). For example, UE adjustment/aggregation system 401 may perform a summing operation and/or one or more other operations (e.g., smoothing, outlier removal, etc.) to generate the aggregate usage metrics. In this sense, the aggregate usage metrics may reflect usage at a given location (e.g., coverage area of a cell, base station 101, etc.) during a given timeframe, based on traffic that is sent or received by UEs that are present (or are predicted to be present) at the location during the timeframe.

In some embodiments, UE adjustment/aggregation system 401 may perform one or more other operations when generating the UE usage metrics. For example, in some embodiments, UE adjustment/aggregation system 401 may simulate, predict, receive, etc. location information associated with each UE (e.g., a precise geographical location, such as a set of latitude and longitude coordinates or other indication of a precise or pinpoint location). In some embodiments, the location information for a given UE may specified in terms of a distance of the UE from a particular set of radio equipment, antennas, reference point within a given wireless coverage area (e.g., a center of the coverage area, a location within the coverage area at which radio equipment is installed, etc.), or in reference to some other landmark, item, topographical feature, building, etc.

In some embodiments, UE adjustment/aggregation system 401 may receive a label or classification associated with each UE such as "real time" or "non-real time." In some embodiments, UE adjustment/aggregation system 401 may generate usage metrics for each UE based on such the location (e.g., precise or pinpoint location) and/or the classification of whether the UE is "real time" or "non-real time." For example, in some embodiments, for UEs with a "real time" label, UE adjustment/aggregation system 401 may disregard or less heavily weight the location of the UE when generating UE usage metrics for such UEs. In some embodiments, for UEs with a "non-real time" label, UE adjustment/aggregation system 401 may more heavily weight the location of the UE when generating UE usage metrics for such UEs. For example, if a "non-real time" UE is located at the edge of a network (e.g., toward the edge of a particular coverage area of a RAN, base station, cell, etc.), then UE adjustment/aggregation system 401 may generate relatively lower UE usage metrics (e.g., lower throughput) for such UEs, as such locations may be associated with slower connections. On the other hand, if a "non-real time" UE is located toward the center of a network (e.g., within a threshold distance of base station or other radio equipment), then UE adjustment/aggregation system 401 may generate relatively higher UE usage metrics (e.g., higher throughput) for such UEs, as such locations may be associated with faster connections.

In some embodiments, the quantity of UEs or groups of UEs having particular labels, seed parameters, etc. may be used to generate the aggregate usage metrics. Generally, for example, if the determined set of UEs consists of a relatively large proportion of UEs with a "streaming video" label (and, accordingly, seed parameters associated with the "streaming video" label) and a relatively small proportion of UEs with a "manufacturing robot" label, then the aggregate UE usage metrics may more closely resemble UE usage metrics for UEs with the "streaming video" label. On the other hand, if the determined set of UEs consists of a relatively large proportion of UEs with a "manufacturing robot" label and a relatively small proportion of UEs with a "streaming video" label, then the aggregate UE usage metrics may more closely resemble UE usage metrics for UEs with the "manufacturing robot" label. That is, in some embodiments, the allocation ratio for a given set of labels or seed parameters, as discussed above, may be used in generating the aggregate usage metrics.

In some embodiments, such as the examples shown here, the aggregate usage metrics may be shown as an amount of usage (e.g., UL and/or DL traffic throughput) as a function of time. In practice, and/or in other embodiments, the aggregate usage may be implemented as some other sort of representation of data, such as a cumulative distribution function.

Figure 5:
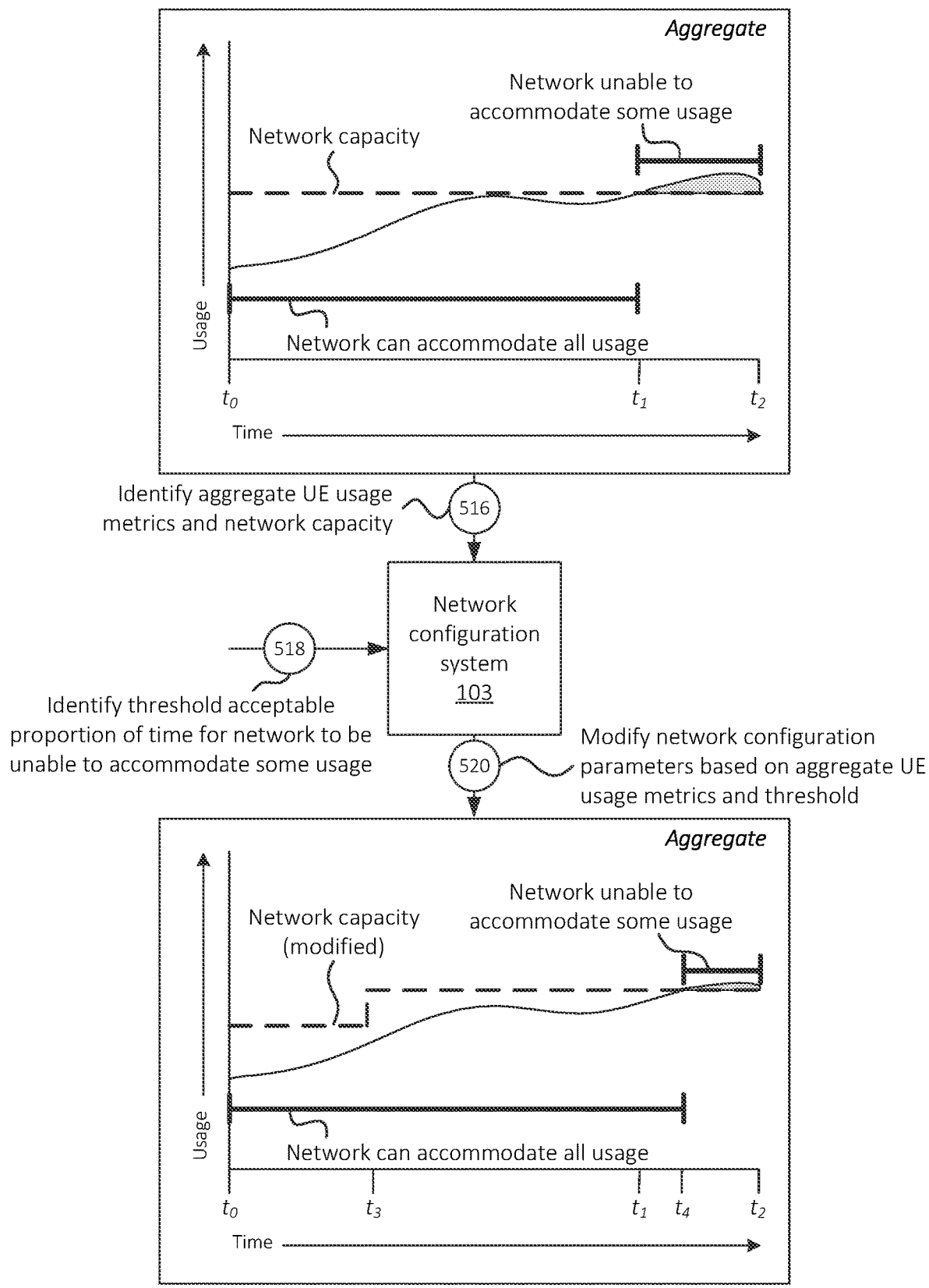
FIG. 5 illustrates an example of modifying network parameters based on aggregate UE usage metrics based on network capacity and one or more thresholds, in accordance with some embodiments.

As shown in FIG. 5, network configuration system 103 may identify (at 516) the aggregate usage metrics associated with the particular location, as generated by UE adjustment/aggregation system 401 or some other device or system, and may also identify network capacity associated with the particular location. The network capacity may be expressed in terms of throughput, amount of RF resources (e.g., quantity of REs and/or PRBs), and/or in some other suitable fashion. In the examples discussed herein, network capacity is referred to as a maximum throughput associated with the particular location, which may be a maximum throughput of base station 101 and/or other network infrastructure that provides connectivity to the particular location. As similarly noted above, the aggregate usage metrics and/or network capacity may be separated on the basis of UL or DL throughput and/or network capacity, or may be a composite based on UL and DL throughput and/or network capacity. Network configuration system 103 may receive the information regarding the network capacity from a network operator, from a device or system that dynamically analyzes and/or determines the network capacity, and/or from some other source.

As shown, the network capacity may be sufficient to handle all traffic, based on the aggregate usage metrics, for one portion of the time window for which the aggregated usage metrics were generated, and may not be sufficient to handle all traffic for another portion of the time window. For example, assume that the time window starts at time $t_0$ and ends at time $t_2$. In the example shown, the aggregate usage metrics indicate aggregate usage, for all UEs at the particular location, below the network capacity between times $t_0$ and $t_1$, where time $t_1$ is in between times $t_0$ and $t_2$. On the other hand, the aggregate usage metrics indicate that the aggregate usage for UEs at the particular location is above the network capacity between times $t_1$ and $t_2$. In other words, the network is able to accommodate all UE usage between times $t_0$ and $t_1$, and is unable to accommodate at least some of the UE usage between times $t_1$ and $t_2$. Thus, during times $t_1$ and $t_2$, some or all UEs may experience issues related to the network capacity being lower than the aggregate UE usage for this timeframe, such as dropped packets, reduced throughput, increased latency, or other issues.

Network configuration system 103 may identify (at 518) a threshold acceptable proportion of time for the network to be unable to accommodate at least some usage. For example, network configuration system 103 may utilize AI/ML techniques or other suitable modeling techniques, may receive input from a network operator, and/or may otherwise identify the threshold proportion of time. In some embodiments, the threshold proportion of time may be a flat percentage, proportion, etc. of time, such as 10% of the time, 15% of the time, etc. In such embodiments, the threshold may be based on duration of time that demand (e.g., aggregate usage) exceeds network capacity by any amount.

Figure 6:
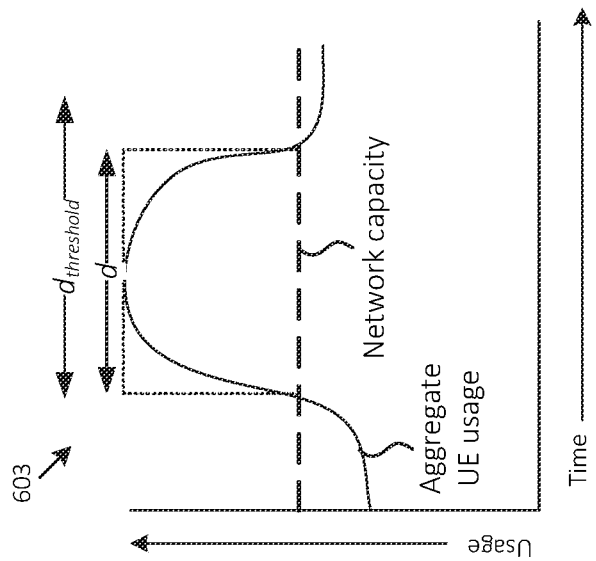
FIG. 6 illustrates two different examples of aggregate UE usage metrics with the same duration of time during which network capacity is exceeded.
Figure 6:
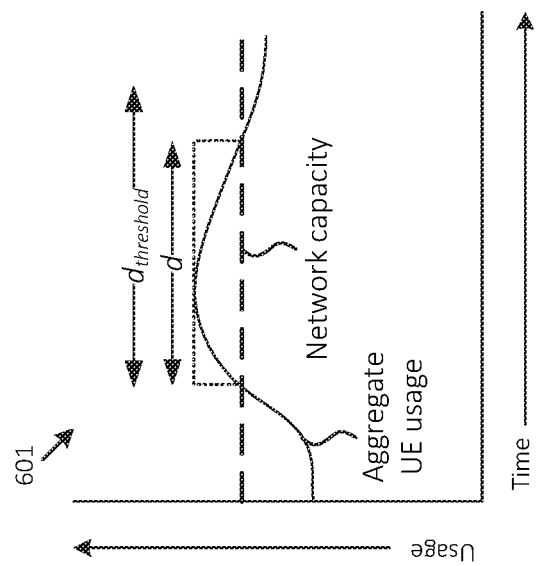

For example, consider two situations, as shown in FIG. 6, where demand exceeds network capacity for the same duration d of time. Graph 601, for example, reflects a first set of example aggregate UE usage metrics compared to network capacity, while graph 603 reflects a second set of example aggregate UE usage metrics compared to the same network capacity. In both graphs 601 and 603, the network is unable to accommodate at least some network traffic for the same duration d of time. However, in graph 603, the amount by which the aggregated UE usage metrics exceed the network capacity during duration d is relatively larger than the amount by which the aggregated UE usage metrics of graph 601 exceed the network capacity. That is, in the situation of graph 603, more network traffic may be dropped, and/or other connectivity issues may be present, during duration d than in the situation of graph 601.

Network configuration system 103 may, in some embodiments, determine the duration of time that a given set of aggregated UE usage metrics exceed network capacity, without regard to the extent or degree to which the aggregated UE usage metrics exceed the network capacity. In such embodiments, graphs 601 and 603 may be evaluated as showing the same duration of time (i.e., duration d) that the aggregated UE usage metrics exceed the network capacity. That is, in such embodiments, the respective amounts by which the usage metrics shown in graphs 601 and 603 exceed the network capacity may not be used to determine whether the duration d is within a threshold acceptable duration $d_{threshold}$. In the example of FIG. 6, both graphs 601 and 603 may reflect that network capacity is unable to accommodate all UE usage traffic for less than the threshold duration $d_{threshold}$. In other words, in such embodiments, the network capacity may generally be considered as acceptable, as the proportion of time that all UEs are able to receive network connectivity may exceed a threshold proportion of time.

In some embodiments, on the other hand, the amount by which the UE usage exceeds the network capacity may be a factor in determining whether the network capacity is acceptable. For example, in some embodiments, the threshold may be a function of both duration and amount by which network capacity is exceeded. An integral (e.g., on a region of graph 601 and/or 603 where the network capacity is exceeded by aggregate UE usage) or other function may be used to determine the amount and duration by which the UE usage exceeds network capacity. In such embodiments, the usage shown in graph 601 may not exceed the threshold, while the usage shown in graph 603 may exceed the threshold. That is, although the durations that network capacity is exceeded is the same in both graphs 601 and 603 (i.e., duration d), the overall amount of usage that exceeds the network capacity may be higher than the threshold in graph 603.

Figure 7:
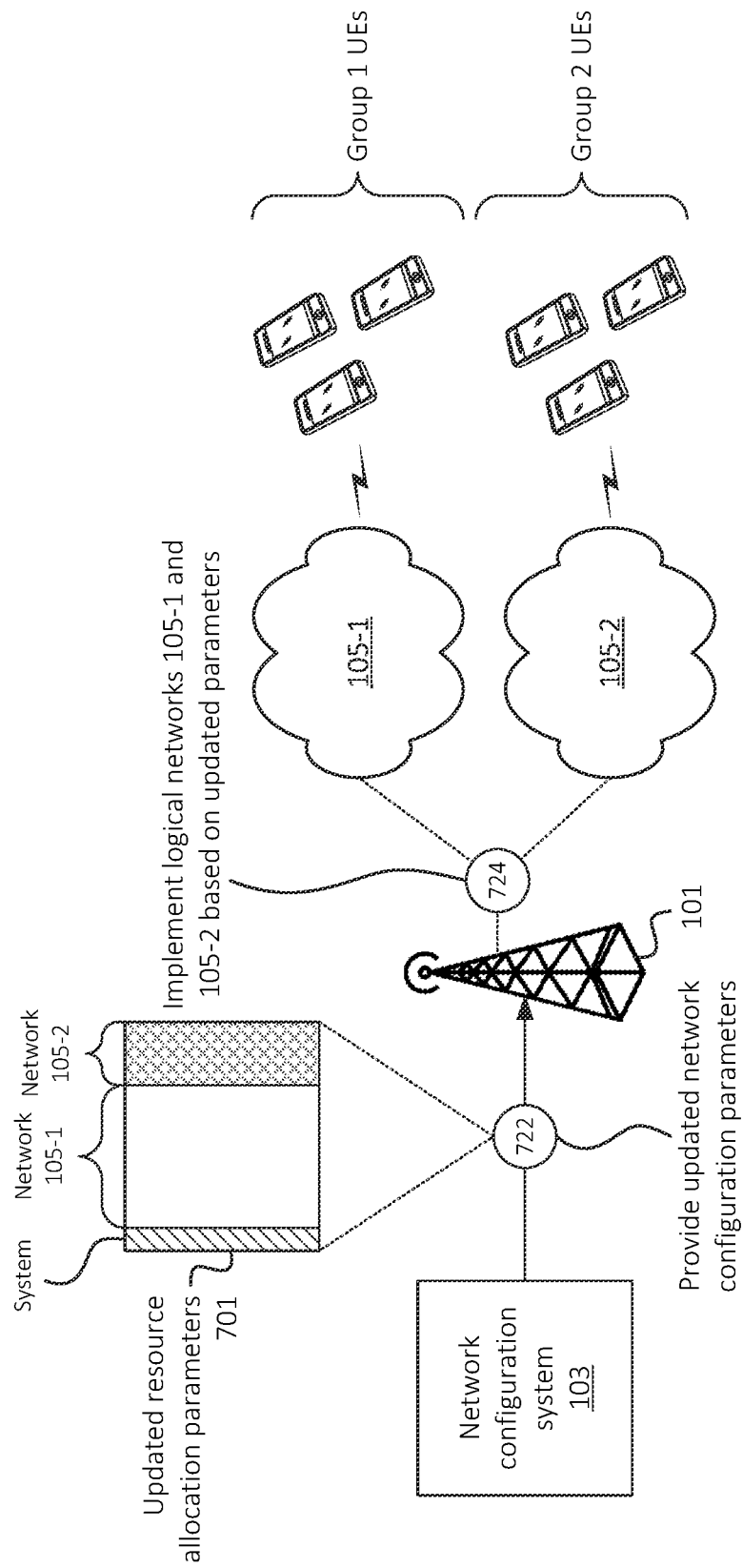
FIG. 7 illustrates an example of modifying network configuration parameters in response to determining that network capacity is exceeded based on aggregate UE usage metrics, in accordance with some embodiments.

Returning to the example of FIG. 5, assume that the amount of time that the network is unable to accommodate the aggregate UE usage (identified at 516) exceeds the threshold amount or proportion of time (e.g., $t_{threshold}$) that is acceptable for the network capacity to be exceeded. Network configuration system 103 may accordingly modify, update, etc. (at 520) network parameters, such as resource allocation parameters 107, to reduce the amount of time that network capacity is exceeded by the aggregate UE usage. As shown in FIG. 7, network configuration system 103 may provide (at 722) the updated network configuration parameters (e.g., updated resource allocation parameters 701) to base station 101, which may implement (at 724) networks 105-1 and 105-2 based on the updated parameters.

For instance, network configuration system 103 may modify parameters associated with a particular network 105 with which the UEs, reflected in the aggregate UE usage metrics, are associated. Additionally, or alternatively, network configuration system 103 may modify parameters associated with one or more other networks 105 that are implemented at the same hardware resources (e.g., base station 101 and/or other resources) as the particular network 105. As such, the parameters of a particular network 105 (e.g., a private network) that shares hardware resources with one or more other networks may be modified in order to ensure that SLAs, QoS parameters, etc. associated with the particular network 105 are maintained.

As one example, assume that the threshold proportion of time that is acceptable for the network capacity to be exceeded is 10% of the example time window (i.e., the time window between times $t_0$ and $t_2$), and that the aggregate UE usage metrics (identified at 516) indicate that the network capacity is exceeded 20% of the time. In this example, network configuration system 103 may modify (at 520) network parameters such that network capacity is exceeded 10% (or less) of the time. For example, network configuration system 103 may allocate additional RF resources to a particular network 105 (e.g., a private network) with which the UEs at the particular location are associated, in order to reduce the amount of time that such UEs experience potential connectivity issues (e.g., dropped packets, reduced throughput, etc.). In some embodiments, the modification to the network modification parameters may include other types of configuration modifications in addition to, or in lieu of, RF allocation parameters, such as queue weight parameters associated with the particular network 105, beamforming parameters associated with the particular network 105, and/or other suitable parameters that ultimately increase the network capacity (e.g., throughput) of network 105.

Based on the modified network configuration parameters, the network capacity of the particular network 105 may be increased, and the duration of time that the particular network 105 is unable to accommodate at least some usage may be reduced. For example, after the modification, the particular network 105 may be able to accommodate all usage (e.g., all expected usage) between times $t_0$ and $t_4$ (e.g., where the duration of times $t_0$ to $t_4$ is longer than the duration of times $t_0$ to $t_1$), and may be unable to accommodate at least some usage between times $t_4$ and $t_2$ (e.g., where the duration of times $t_4$ to $t_2$ is shorter than the duration of times $t_1$ to $t_2$).

As further shown, modifying the network configuration parameters may include modifications that reduce network capacity for some time. For example, network configuration system 103 may identify that usage is relatively low between times $t_0$ and $t_3$, and may accordingly implement network configuration modifications that reduce network capacity between times $t_0$ and $t_3$. That is, in this example, the modified network capacity may be lower than the original network capacity between times $t_0$ and $t_3$, and may be higher than the original network capacity between timed $t_3$ and $t_2$.

In this manner, resources that would otherwise be allocated to this particular network 105 may be allocated to another network implemented at the same location (e.g., a private network, a public network, etc. that utilizes shared resources with the particular network 105). As such, the overall efficiency and utilization of the hardware resources may be maximized without sacrificing performance. Additionally, performance of other networks (e.g., that are implemented at the same hardware resources as the particular network 105) may be improved without impacting the performance of the particular network 105.

In the preceding examples, network configuration system 103, UE prediction system 201, seed generation system 203, pseudo-random UE usage generator 301, and UE adjustment/aggregation system 401 are described as separate systems. As such, in some embodiments, network configuration system 103, UE prediction system 201, seed generation system 203, pseudo-random UE usage generator 301, and UE adjustment/aggregation system 401 may each be implemented by separate devices or systems (e.g., servers, cloud computing systems, virtualized environments, etc.) that communicate via one or more networks, interfaces, etc. In some embodiments, one or more of network configuration system 103, UE prediction system 201, seed generation system 203, pseudo-random UE usage generator 301, and/or UE adjustment/aggregation system 401 may be implemented by the same device or system. For example, a device or system that implements network configuration system 103 may also implement UE prediction system 201, seed generation system 203, pseudo-random UE usage generator 301, and/or UE adjustment/aggregation system 401.

Figure 8:
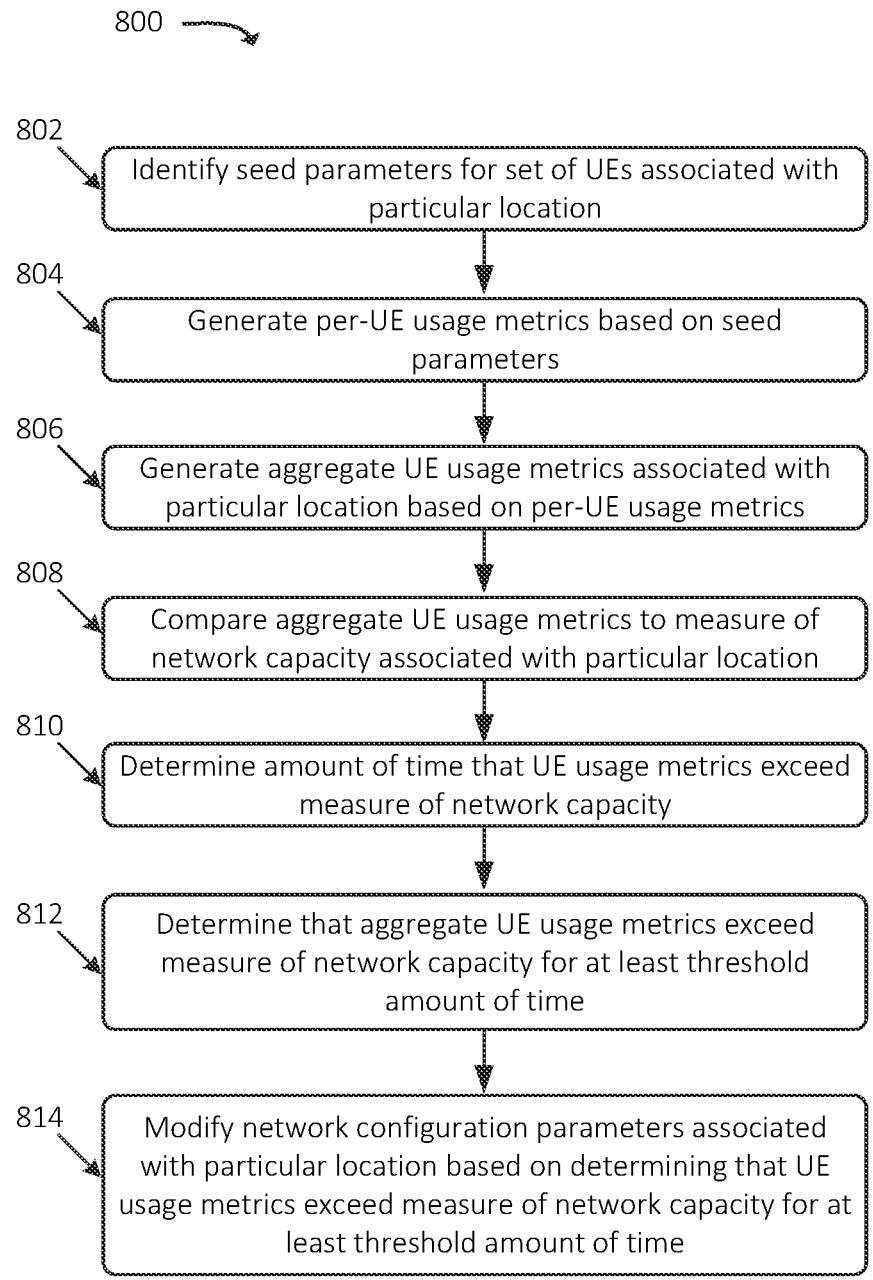
FIG. 8 illustrates an example process for adjusting network configuration parameters based on aggregate UE usage metrics, network capacity, and one or more thresholds, in accordance with some embodiments.

FIG. 8 illustrates an example process 800 for adjusting network configuration parameters based on aggregate UE usage metrics, network capacity, and one or more thresholds, in accordance with some embodiments. In some embodiments, some or all of process 800 may be performed by network configuration system 103. In some embodiments, one or more other devices may perform some or all of process 800 in concert with, and/or in lieu of, network configuration system 103. For example, as discussed above, some or all of process 800 may be performed by one or more of UE prediction system 201, seed generation system 203, pseudo-random UE usage generator 301, and/or UE adjustment/aggregation system 401. In some embodiments, the same device or system may implement one or more of network configuration system 103, UE prediction system 201, seed generation system 203, pseudo-random UE usage generator 301, and/or UE adjustment/aggregation system 401.

As shown, process 800 may include identifying (at 802) seed parameters for a set of UEs associated with a particular location. For example, as discussed above, network configuration system 103 may identify seed parameters that are used in a pseudo-random determination or generation of UE usage metrics. The set of UEs may be identified based on predictive techniques, such as AI/ML techniques, or may be specified in some other manner. The UEs may be associated with particular usage patterns, characteristics, attributes, labels, etc. Such usage patterns, labels, etc. may be translated, mapped, etc. to the seed parameters. Additionally, or alternatively, the seed parameters may be identified or received without such translation or mapping of labels to seed parameters. The particular location may be associated with multiple networks 105, such as one or more private networks and/or one or more public networks. The set of UEs may be associated with, in some embodiments, a particular network 105 of the multiple networks 105 implemented at the particular location. In some embodiments, the multiple networks 105 may be implemented using a set of shared resources, such as hardware resources of a particular base station 101, a particular cell, a particular set of antennas, etc. In some embodiments, the set of UEs may be determined based on an expected or predicted presence of the set of UEs at the particular location during a particular timeframe (e.g., during a daily commute, during a workday, during a scheduled event, etc.).

Process 800 may further include generating (at 804) per-UE usage metrics based on the seed parameters. For example, network configuration system 103 may utilize pseudo-random techniques or other suitable techniques to generate UE usage metrics over the particular timeframe during which the UEs are predicted or expected to be present at the particular location. The usage metrics may include, for example, an amount of throughput that is used, or is predicted to be used, by the UE (e.g., outputted and/or received by the UE) as a function of time. In this manner, UE usage metrics may be determined, predicted, simulated, etc. for each UE that is determined as being located at, or is expected to be located at, the particular location during the particular timeframe.

Process 800 may additionally include generating (at 806) aggregate UE usage metrics associated with the particular location based on the per-UE usage metrics. For example, network configuration system 103 may combine the per-UE usage metrics by performing a summing operation or one or more other suitable operations (e.g., a smoothing operation, an outlier removal operation, etc.) to generate the aggregate UE usage metrics.

Process 800 may also include comparing (at 808) the aggregate UE usage metrics to a measure of network capacity associated with the particular location. For example, the particular location may be associated with a particular base station 101 or other set of network infrastructure hardware, that provides a set of resources (e.g., RF resources such as REs, PRBs, etc.) to a particular network 105 with which the UEs are associated (e.g., to which the UEs have access or authorization to connect). The measure of network capacity may reflect a total amount of resources (e.g., RF resources or other resources) that are available for use by the UEs at the particular location. Different locations may be associated with different capacities, such as in situations where different types of hardware resources are available at different locations, where different network configuration parameters provide different amounts of resources for various networks 105, and/or in other situations.

Process 800 may further include determining (at 810) an amount of time that the aggregate UE usage metrics exceed the measure of network capacity. Generally, for example, network configuration system 103 may determine whether the network has sufficient capacity to handle most or all UE traffic as indicated by the aggregate UE usage metrics (e.g., as a function of time, expressed as a cumulative distribution function, etc.). For example, network configuration system 103 may determine that an amount of UE usage (e.g., amount of UL and/or DL throughput associated with the set of UEs) exceeds the network capacity for a portion of the particular timeframe. For instance, if the timeframe is five minutes long and the aggregate UE usage exceeds the network capacity for two minutes, then network configuration system 103 may determine that the aggregate UE usage metrics exceed the network capacity for two minutes or for 40% of the timeframe.

In some embodiments, as discussed above, network configuration system 103 may determine an amount by which the aggregate UE usage exceeds the network capacity. For instance, if the network capacity is 100 MB/s and the aggregate UE usage is 115 MB/s for a portion of the timeframe, network configuration system 103 may determine that the amount by which the aggregate usage exceeds the network capacity is 15 MB/s for this portion of the timeframe. In some embodiments, network configuration system 103 may generate a score or other value that is based on both the duration that the aggregate UE usage exceeds the network capacity, and the amount by which the aggregate UE usage exceeds the network capacity.

Process 800 may additionally include determining (at 812) that the aggregate UE metrics exceed the measure of network capacity for at least a threshold amount of time. The threshold amount of time may relate to an acceptable amount of time during which the network capacity is exceeded, which may generally correspond to an amount or proportion of time that the UEs experience dropped packets, reduced throughput, and/or other potential connectivity issues. The threshold amount or proportion of time may be relatively low (e.g., 1% of the time, 0.5% of the time, etc.) in order to maximize user satisfaction and a high quality of user experience. Thus, in a situation where network capacity is exceeded for, for example, 40% of the timeframe, network configuration system 103 may determine that the threshold amount or proportion of time is exceeded.

In some embodiments, network configuration system 103 may utilize a threshold that is further based on amount by which the network capacity is exceeded. For example, in situations where network capacity is exceeded by relatively large amounts, the threshold amount of time that is acceptable for the network capacity to be exceeded may be relatively lower than situations in which the network capacity is exceeded by relatively smaller amounts. Exceeding the network capacity by larger amounts may generally indicate greater degradations to UE performance, and may therefore be more heavily avoided. In such embodiments, the threshold may include or may be based on a score or other value that reflects both the duration that the aggregate UE usage exceeds the network capacity, and the amount by which the aggregate UE usage exceeds the network capacity. This threshold score or other value may be compared against a score or other value determined (at 810) based on the duration that the aggregate UE usage exceeds the network capacity and the amount by which the aggregate UE usage exceeds the network capacity.

Process 800 may also include modifying (at 814) network configuration parameters associated with the particular location based on determining that the UE usage metrics exceed the measure of network capacity for at least the threshold amount of time. For example, network configuration system 103 may increase a resource allocation or instruct base station 101 (or other suitable network infrastructure elements) to perform other configuration changes, in order to increase network capacity for the set of UEs. In situations where the set of UEs are associated with a particular network 105 (e.g., a private network or other network with SLAs, QoS parameters, etc.), the modified network configuration parameters may include parameters to increase RF resources, queue priority parameters, etc. associated with the particular network 105, as implemented at the particular location. In some embodiments, the modified network parameters may include parameters for other networks 105 implemented at the particular location, including networks with which the set of UEs are not necessarily associated. For example, the modified network parameters may include increasing a resource allocation for a particular network 105 with which the UEs are associated, and reducing a resource allocation for a public network or another network implemented by hardware resources that are shared with the particular network 105. Generally, the network configuration parameter modifications may be made in order to reduce the duration of time, that the network capacity is exceeded by the aggregate UE usage metrics, to approximately (or below) the threshold amount of time that is acceptable for the network capacity to be exceeded, thus preserving the quality of experience associated with the set of UEs.

In some embodiments, in addition to, or in lieu of modifying network configuration parameters, network configuration system 103 may generate one or more reports, alerts, etc., indicating some or all of the information discussed above (e.g., as identified, generated, determined, etc. at operations 802-812). For example, network configuration system 103 may generate a report with one or more graphs, charts, or other indications that reflect a predicted, estimated, etc. set of aggregated UE usage metrics as a function of time. As noted above, such reports, alerts, etc. may be associated with a particular location, such as a coverage area associated with one or more base stations, RANs, radio equipment, etc. Additionally, or alternatively, such reports, alerts, etc. may be associated with recurring events or temporal conditions, such as workdays, weekends, seasonal holidays, etc. Additionally, or alternatively, such reports, alerts, etc. may be associated with scheduled events such as sports games, concerts, etc. Additionally, or alternatively, such reports, alerts, etc. may be associated with particular device type, traffic types, classes, categories, etc. of UEs, such as manufacturing robots, mobile telephones, etc.

In this manner, a network operator or planner may be able to readily identify when, where, why, and to what extent network infrastructure or network parameters should be modified, and may thus make informed decisions relating to network planning and deployment. In some embodiments, such reports or alerts may include a proposed hardware deployment change, such as adding additional radio equipment or other network infrastructure equipment, which would increase the network capacity such that most or all of the expected UE traffic (e.g., as indicated by the aggregate UE usage metrics) can be accommodated by the network. As such, a network operator, planner, etc. may be able to design, deploy, etc. network infrastructure equipment in locations where such equipment is not yet deployed (e.g., a "green field" deployment), by providing labels or categories of UEs or groups of UEs that are predicted to be present at such locations, and receiving reports or recommendations (e.g., from network configuration system 103) indicating network equipment and/or configurations thereof that would be able to serve the UEs according to their expected usage.

Figure 9:
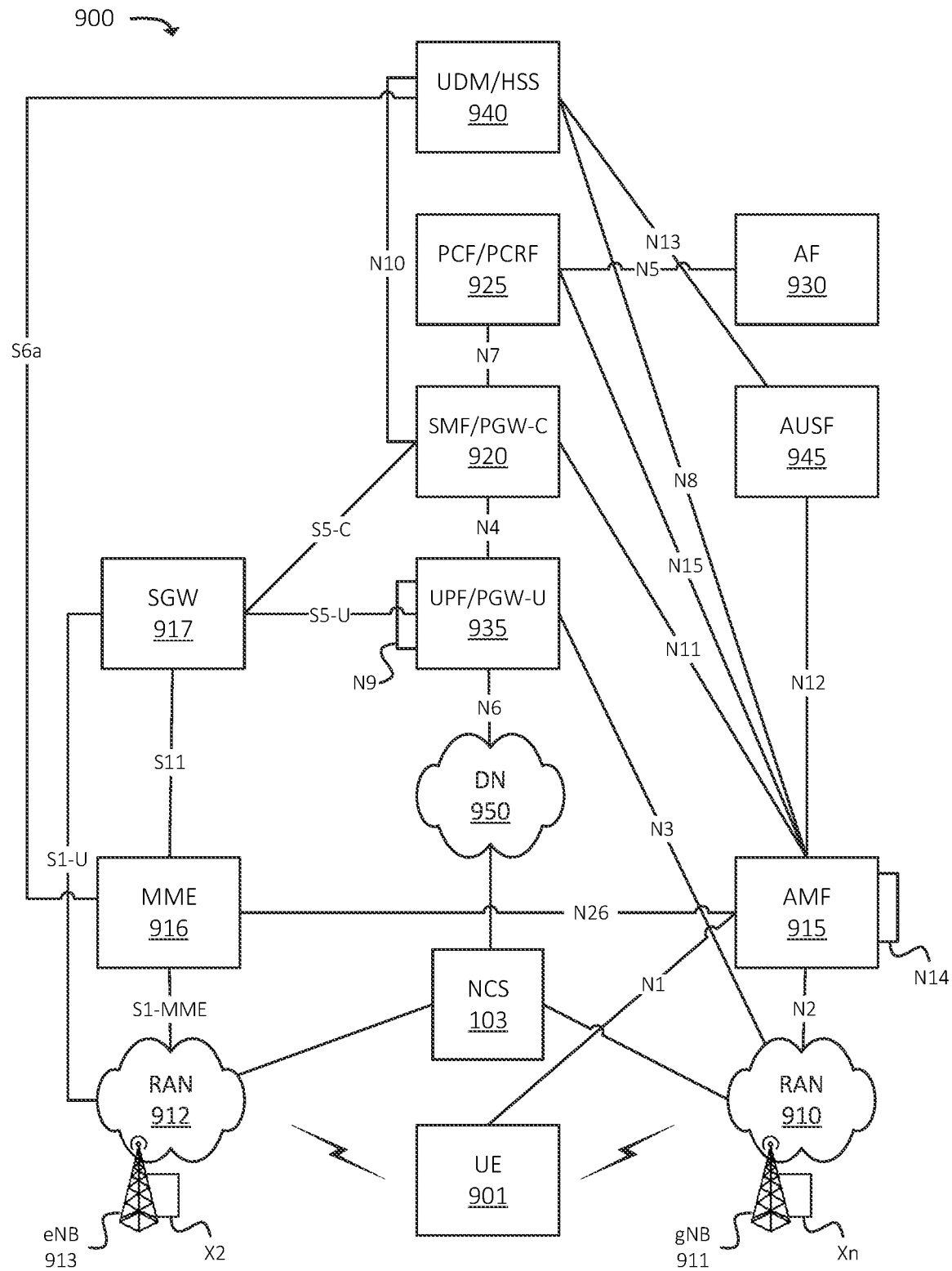
FIG. 9 illustrates an example environment in which one or more embodiments, described herein, may be implemented.

FIG. 9 illustrates an example environment 900, in which one or more embodiments may be implemented. In some embodiments, environment 900 may correspond to a Fifth Generation ("5G") network, and/or may include elements of a 5G network. In some embodiments, environment 900 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 900 may represent or may include a 5G core ("5GC"). As shown, environment 900 may include UE 901, RAN 910 (which may include one or more Next Generation Node Bs ("gNBs") 911), RAN 912 (which may include one or more evolved Node Bs ("eNBs") 913), and various network functions such as Access and Mobility Management Function ("AMF") 915, Mobility Management Entity ("MME") 916, Serving Gateway ("SGW") 917, Session Management Function ("SMF")/Packet Data Network ("PDN") Gateway ("PGW")-Control plane function ("PGW-C") 920, Policy Control Function ("PCF")/Policy Charging and Rules Function ("PCRF") 925, Application Function ("AF") 930, User Plane Function ("UPF")/PGW-User plane function ("PGW-U") 935, Unified Data Management ("UDM")/Home Subscriber Server ("HSS") 940, and Authentication Server Function ("AUSF") 945. Environment 900 may also include one or more networks, such as Data Network ("DN") 950. Environment 900 may include one or more additional devices or systems communicatively coupled to one or more networks (e.g., DN 950), such as network configuration system 103, UE prediction system 201, seed generation system 203, pseudo-random UE usage generator 301, and/or UE adjustment/aggregation system 401. As noted above, in some embodiments, network configuration system 103 may perform some or all of the functionality described above with respect to UE prediction system 201, seed generation system 203, pseudo-random UE usage generator 301, and/or UE adjustment/aggregation system 401.

The example shown in FIG. 9 illustrates one instance of each network component or function (e.g., one instance of SMF/PGW-C 920, PCF/PCRF 925, UPF/PGW-U 935, UDM/HSS 940, and/or AUSF 945). In practice, environment 900 may include multiple instances of such components or functions. For example, in some embodiments, environment 900 may include multiple "slices" of a core network, where each slice includes a discrete and/or logical set of network functions (e.g., one slice may include a first instance of SMF/PGW-C 920, PCF/PCRF 925, UPF/PGW-U 935, UDM/HSS 940, and/or AUSF 945, while another slice may include a second instance of SMF/PGW-C 920, PCF/PCRF 925, UPF/PGW-U 935, UDM/HSS 940, and/or AUSF 945). The different slices may provide differentiated levels of service, such as service in accordance with different Quality of Service ("QoS") parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. Alternatively, or additionally, one or more of the devices of environment 900 may perform one or more network functions described as being performed by another one or more of the devices of environment 900. Devices of environment 900 may interconnect with each other and/or other devices via wired connections, wireless connections, or a combination of wired and wireless connections. In some implementations, one or more devices of environment 900 may be physically integrated in, and/or may be physically attached to, one or more other devices of environment 900.

UE 901 may include a computation and communication device, such as a wireless mobile communication device that is capable of communicating with RAN 910, RAN 912, and/or DN 950. UE 901 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, a Machine-to-Machine ("M2M") device, or the like), or another type of mobile computation and communication device. UE 901 may send traffic $t_0$ and/or receive traffic (e.g., user plane traffic) from DN 950 via RAN 910, RAN 912, and/or UPF/PGW-U 935.

RAN 910 may be, or may include, a 5G RAN that includes one or more base stations (e.g., one or more gNBs 911), via which UE 901 may communicate with one or more other elements of environment 900. UE 901 may communicate with RAN 910 via an air interface (e.g., as provided by gNB 911). For instance, RAN 910 may receive traffic (e.g., voice call traffic, data traffic, messaging traffic, signaling traffic, etc.) from UE 901 via the air interface, and may communicate the traffic to UPF/PGW-U 935, and/or one or more other devices or networks. Similarly, RAN 910 may receive traffic intended for UE 901 (e.g., from UPF/PGW-U 935, AMF 915, and/or one or more other devices or networks) and may communicate the traffic to UE 901 via the air interface. In some embodiments, base station 101 may be, may include, and/or may be implemented by one or more gNBs 911.

RAN 912 may be, or may include, a LTE RAN that includes one or more base stations (e.g., one or more eNBs 913), via which UE 901 may communicate with one or more other elements of environment 900. UE 901 may communicate with RAN 912 via an air interface (e.g., as provided by eNB 913). For instance, RAN 912 may receive traffic (e.g., voice call traffic, data traffic, messaging traffic, signaling traffic, etc.) from UE 901 via the air interface, and may communicate the traffic to UPF/PGW-U 935, and/or one or more other devices or networks. Similarly, RAN 912 may receive traffic intended for UE 901 (e.g., from UPF/PGW-U 935, SGW 917, and/or one or more other devices or networks) and may communicate the traffic to UE 901 via the air interface. In some embodiments, base station 101 may be, may include, and/or may be implemented by one or more eNBs 913.

AMF 915 may include one or more devices, systems, Virtualized Network Functions ("VNFs"), Cloud-Native Network Functions ("CNFs"), etc., that perform operations to register UE 901 with the 5G network, to establish bearer channels associated with a session with UE 901, to hand off UE 901 from the 5G network to another network, to hand off UE 901 from the other network to the 5G network, manage mobility of UE 901 between RANs 910 and/or gNBs 911, and/or to perform other operations. In some embodiments, the 5G network may include multiple AMFs 915, which communicate with each other via the N14 interface (denoted in FIG. 9 by the line marked "N14" originating and terminating at AMF 915).

MME 916 may include one or more devices, systems, VNFs, CNFs, etc., that perform operations to register UE 901 with the EPC, to establish bearer channels associated with a session with UE 901, to hand off UE 901 from the EPC to another network, to hand off UE 901 from another network to the EPC, manage mobility of UE 901 between RANs 912 and/or eNBs 913, and/or to perform other operations.

SGW 917 may include one or more devices, systems, VNFs, CNFs, etc., that aggregate traffic received from one or more eNBs 913 and send the aggregated traffic to an external network or device via UPF/PGW-U 935. Additionally, SGW 917 may aggregate traffic received from one or more UPF/PGW-Us 935 and may send the aggregated traffic to one or more eNBs 913. SGW 917 may operate as an anchor for the user plane during inter-eNB handovers and as an anchor for mobility between different telecommunication networks or RANs (e.g., RANs 910 and 912).

SMF/PGW-C 920 may include one or more devices, systems, VNFs, CNFs, etc., that gather, process, store, and/or provide information in a manner described herein. SMF/PGW-C 920 may, for example, facilitate the establishment of communication sessions on behalf of UE 901. In some embodiments, the establishment of communications sessions may be performed in accordance with one or more policies provided by PCF/PCRF 925.

PCF/PCRF 925 may include one or more devices, systems, VNFs, CNFs, etc., that aggregate information to and from the 5G network and/or other sources. PCF/PCRF 925 may receive information regarding policies and/or subscriptions from one or more sources, such as subscriber databases and/or from one or more users (such as, for example, an administrator associated with PCF/PCRF 925).

AF 930 may include one or more devices, systems, VNFs, CNFs, etc., that receive, store, and/or provide information that may be used in determining parameters (e.g., quality of service parameters, charging parameters, or the like) for certain applications.

UPF/PGW-U 935 may include one or more devices, systems, VNFs, CNFs, etc., that receive, store, and/or provide data (e.g., user plane data). For example, UPF/PGW-U 935 may receive user plane data (e.g., voice call traffic, data traffic, etc.), destined for UE 901, from DN 950, and may forward the user plane data toward UE 901 (e.g., via RAN 910, SMF/PGW-C 920, and/or one or more other devices). In some embodiments, multiple UPFs 935 may be deployed (e.g., in different geographical locations), and the delivery of content to UE 901 may be coordinated via the N9 interface (e.g., as denoted in FIG. 9 by the line marked "N9" originating and terminating at UPF/PGW-U 935). Similarly, UPF/PGW-U 935 may receive traffic from UE 901 (e.g., via RAN 910, SMF/PGW-C 920, and/or one or more other devices), and may forward the traffic toward DN 950. In some embodiments, UPF/PGW-U 935 may communicate (e.g., via the N4 interface) with SMF/PGW-C 920, regarding user plane data processed by UPF/PGW-U 935.

UDM/HSS 940 and AUSF 945 may include one or more devices, systems, VNFs, CNFs, etc., that manage, update, and/or store, in one or more memory devices associated with AUSF 945 and/or UDM/HSS 940, profile information associated with a subscriber. AUSF 945 and/or UDM/HSS 940 may perform authentication, authorization, and/or accounting operations associated with the subscriber and/or a communication session with UE 901.

DN 950 may include one or more wired and/or wireless networks. For example, DN 950 may include an Internet Protocol ("IP")-based PDN, a wide area network ("WAN") such as the Internet, a private enterprise network, and/or one or more other networks. UE 901 may communicate, through DN 950, with data servers, other UEs 901, and/or to other servers or applications that are coupled to DN 950. DN 950 may be connected to one or more other networks, such as a public switched telephone network ("PSTN"), a public land mobile network ("PLMN"), and/or another network. DN 950 may be connected to one or more devices, such as content providers, applications, web servers, and/or other devices, with which UE 901 may communicate.

Figure 10:
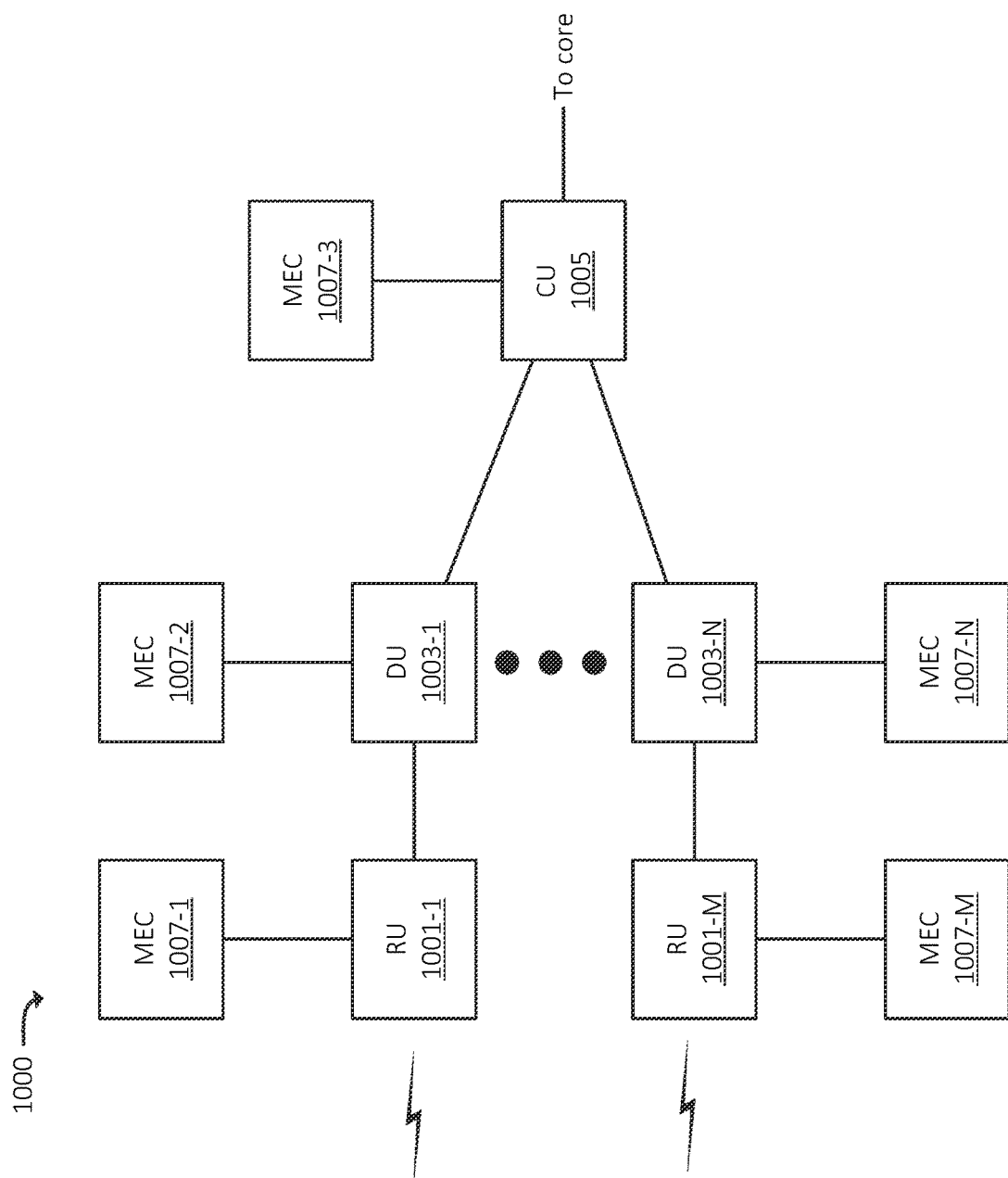
FIG. 10 illustrates an example arrangement of a radio access network ("RAN"), in accordance with some embodiments.

FIG. 10 illustrates an example Distributed Unit ("DU") network 1000, which may be included in and/or implemented by one or more RANs (e.g., RAN 910, RAN 912, or some other RAN). In some embodiments, a particular RAN may include one DU network 1000. In some embodiments, a particular RAN may include multiple DU networks 1000. In some embodiments, DU network 1000 may correspond to a particular gNB 911 of a 5G RAN (e.g., RAN 910). In some embodiments, DU network 1000 may correspond to multiple gNBs 911. In some embodiments, DU network 1000 may correspond to one or more other types of base stations of one or more other types of RANs. As shown, DU network 1000 may include Central Unit ("CU") 1005, one or more Distributed Units ("DUs") 1003-1 through 1003-N (referred to individually as "DU 1003," or collectively as "DUs 1003"), and one or more Radio Units ("RUs") 1001-1 through 1001-M (referred to individually as "RU 1001," or collectively as "RUs 1001").

CU 1005 may communicate with a core of a wireless network (e.g., may communicate with one or more of the devices or systems described above with respect to FIG. 9, such as AMF 915 and/or UPF/PGW-U 935). In the uplink direction (e.g., for traffic from UEs 901 to a core network), CU 1005 may aggregate traffic from DUs 1003, and forward the aggregated traffic to the core network. In some embodiments, CU 1005 may receive traffic according to a given protocol (e.g., Radio Link Control ("RLC")) from DUs 1003, and may perform higher-layer processing (e.g., may aggregate/process RLC packets and generate Packet Data Convergence Protocol ("PDCP") packets based on the RLC packets) on the traffic received from DUs 1003.

In accordance with some embodiments, CU 1005 may receive downlink traffic (e.g., traffic from the core network) for a particular UE 901, and may determine which DU(s) 1003 should receive the downlink traffic. DU 1003 may include one or more devices that transmit traffic between a core network (e.g., via CU 1005) and UE 901 (e.g., via a respective RU 1001). DU 1003 may, for example, receive traffic from RU 1001 at a first layer (e.g., physical ("PHY") layer traffic, or lower PHY layer traffic), and may process/aggregate the traffic to a second layer (e.g., upper PHY and/or RLC). DU 1003 may receive traffic from CU 1005 at the second layer, may process the traffic to the first layer, and provide the processed traffic to a respective RU 1001 for transmission to UE 901.

RU 1001 may include hardware circuitry (e.g., one or more RF transceivers, antennas, radios, and/or other suitable hardware) to communicate wirelessly (e.g., via an RF interface) with one or more UEs 901, one or more other DUs 1003 (e.g., via RUs 1001 associated with DUs 1003), and/or any other suitable type of device. In the uplink direction, RU 1001 may receive traffic from UE 901 and/or another DU 1003 via the RF interface and may provide the traffic to DU 1003. In the downlink direction, RU 1001 may receive traffic from DU 1003, and may provide the traffic to UE 901 and/or another DU 1003.

RUs 1001 may, in some embodiments, be communicatively coupled to one or more Multi-Access/Mobile Edge Computing ("MEC") devices, referred to sometimes herein simply as "MECs" 1007. For example, RU 1001-1 may be communicatively coupled to MEC 1007-1, RU 1001-M may be communicatively coupled to MEC 1007-M, DU 1003-1 may be communicatively coupled to MEC 1007-2, DU 1003-N may be communicatively coupled to MEC 1007-N, CU 1005 may be communicatively coupled to MEC 1007-3, and so on. MECs 1007 may include hardware resources (e.g., configurable or provisionable hardware resources) that may be configured to provide services and/or otherwise process traffic $t_o$ and/or from UE 901, via a respective RU 1001.

For example, RU 1001-1 may route some traffic, from UE 901, to MEC 1007-1 instead of to a core network via DU 1003 and CU 1005. MEC 1007-1 may process the traffic, perform one or more computations based on the received traffic, and may provide traffic to UE 901 via RU 1001-1. In some embodiments, MEC 1007 may include, and/or may implement, some or all of the functionality described above with respect to network configuration system 103, AF 930, UPF 935, and/or one or more other devices, systems, VNFs, CNFs, etc. In this manner, ultra-low latency services may be provided to UE 901, as traffic does not need to traverse DU 1003, CU 1005, and an intervening backhaul network between DU network 1000 and the core network.

Figure 11:
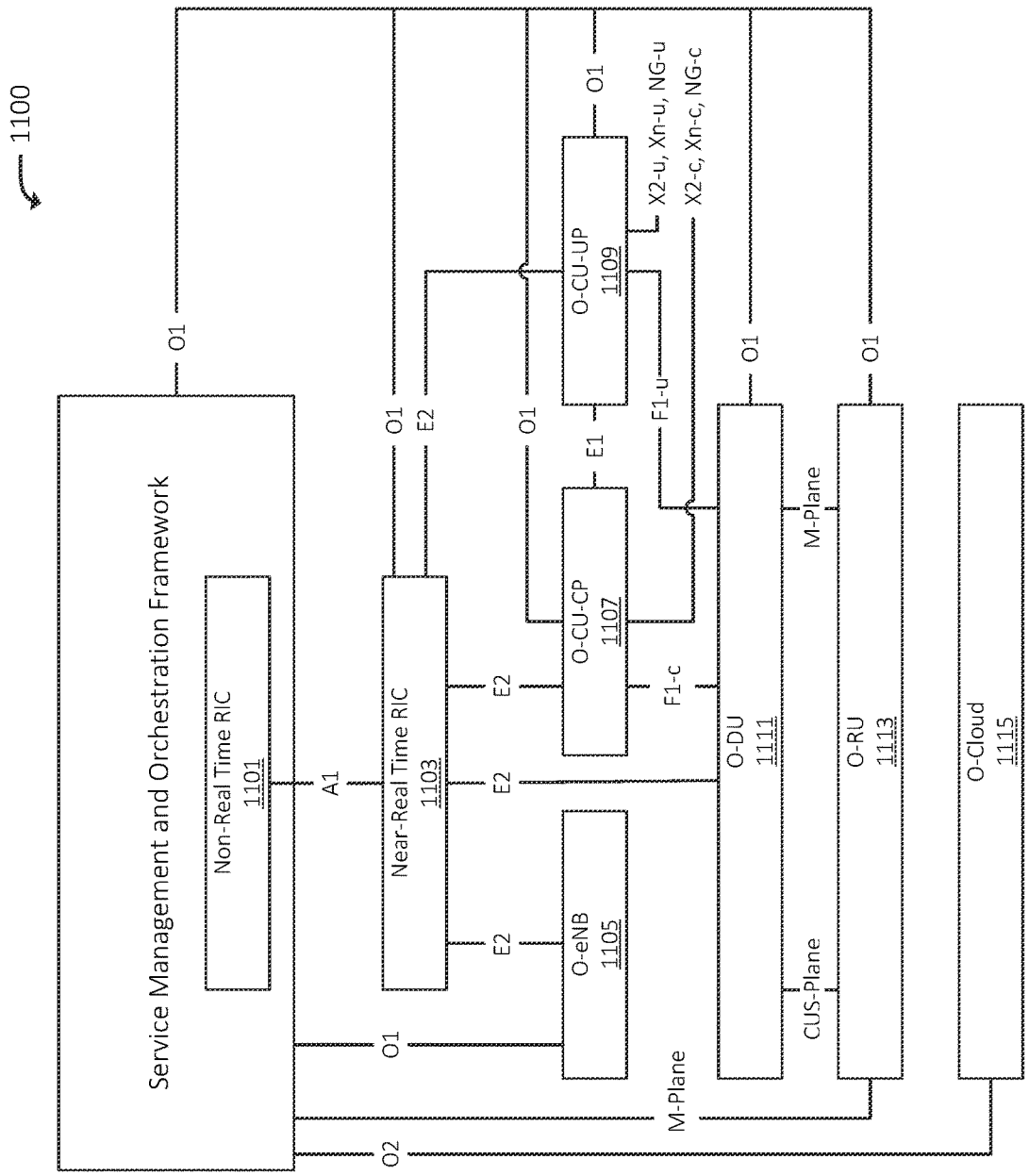
FIG. 11 illustrates an example arrangement of an Open RAN ("O-RAN") environment in which one or more embodiments, described herein, may be implemented.

FIG. 11 illustrates an example O-RAN environment 1100, which may correspond to RAN 910, RAN 912, and/or DU network 1000. For example, RAN 910, RAN 912, and/or DU network 1000 may include one or more instances of O-RAN environment 1100, and/or one or more instances of O-RAN environment 1100 may implement RAN 910, RAN 912, DU network 1000, and/or some portion thereof. As shown, O-RAN environment 1100 may include Non-Real Time Radio Intelligent Controller ("RIC") 1101, Near-Real Time RIC 1103, O-eNB 1105, O-CU-Control Plane ("O-CU-CP") 1107, O-CU-User Plane ("O-CU-UP") 1109, O-DU 1111, O-RU 1113, and O-Cloud 1115. In some embodiments, O-RAN environment 1100 may include additional, fewer, different, and/or differently arranged components.

In some embodiments, some or all of the elements of O-RAN environment 1100 may be implemented by one or more configurable or provisionable resources, such as virtual machines, cloud computing systems, physical servers, and/or other types of configurable or provisionable resources. In some embodiments, some or all of O-RAN environment 1100 may be implemented by, and/or communicatively coupled to, one or more MECs 1007.

Non-Real Time RIC 1101 and Near-Real Time RIC 1103 may receive performance information (and/or other types of information) from one or more sources, and may configure other elements of O-RAN environment 1100 based on such performance or other information. For example, Near-Real Time RIC 1103 may receive performance information, via one or more E2 interfaces, from O-eNB 1105, O-CU-CP 1107, and/or O-CU-UP 1109, and may modify parameters associated with O-eNB 1105, O-CU-CP 1107, and/or O-CU-UP 1109 based on such performance information. Similarly, Non-Real Time RIC 1101 may receive performance information associated with O-eNB 1105, O-CU-CP 1107, O-CU-UP 1109, and/or one or more other elements of O-RAN environment 1100 and may utilize machine learning and/or other higher level computing or processing to determine modifications to the configuration of O-eNB 1105, O-CU-CP 1107, O-CU-UP 1109, and/or other elements of O-RAN environment 1100. In some embodiments, Non-Real Time RIC 1101 may generate machine learning models based on performance information associated with O-RAN environment 1100 or other sources, and may provide such models to Near-Real Time RIC 1103 for implementation. In some embodiments, Non-Real Time RIC 1101 and/or Near-Real Time RIC 1103 may perform some or all of the functionality of network configuration system 103, or vice versa.

O-eNB 1105 may perform functions similar to those described above with respect to gNB 911, eNB 913, and/or base station 101. For example, O-eNB 1105 may facilitate wireless communications between UE 901 and a core network. O-CU-CP 1107 may perform control plane signaling to coordinate the aggregation and/or distribution of traffic via one or more DUs 1003, which may include and/or be implemented by one or more O-DUs 1111, and O-CU-UP 1109 may perform the aggregation and/or distribution of traffic via such DUs 1003 (e.g., O-DUs 1111). O-DU 1111 may be communicatively coupled to one or more RUs 1001, which may include and/or may be implemented by one or more O-RUs 1113. In some embodiments, O-Cloud 1115 may include or be implemented by one or more MECs 1007, which may provide services, and may be communicatively coupled, to O-CU-CP 1107, O-CU-UP 1109, O-DU 1111, and/or O-RU 1113 (e.g., via an O1 and/or O2 interface).

Figure 12:
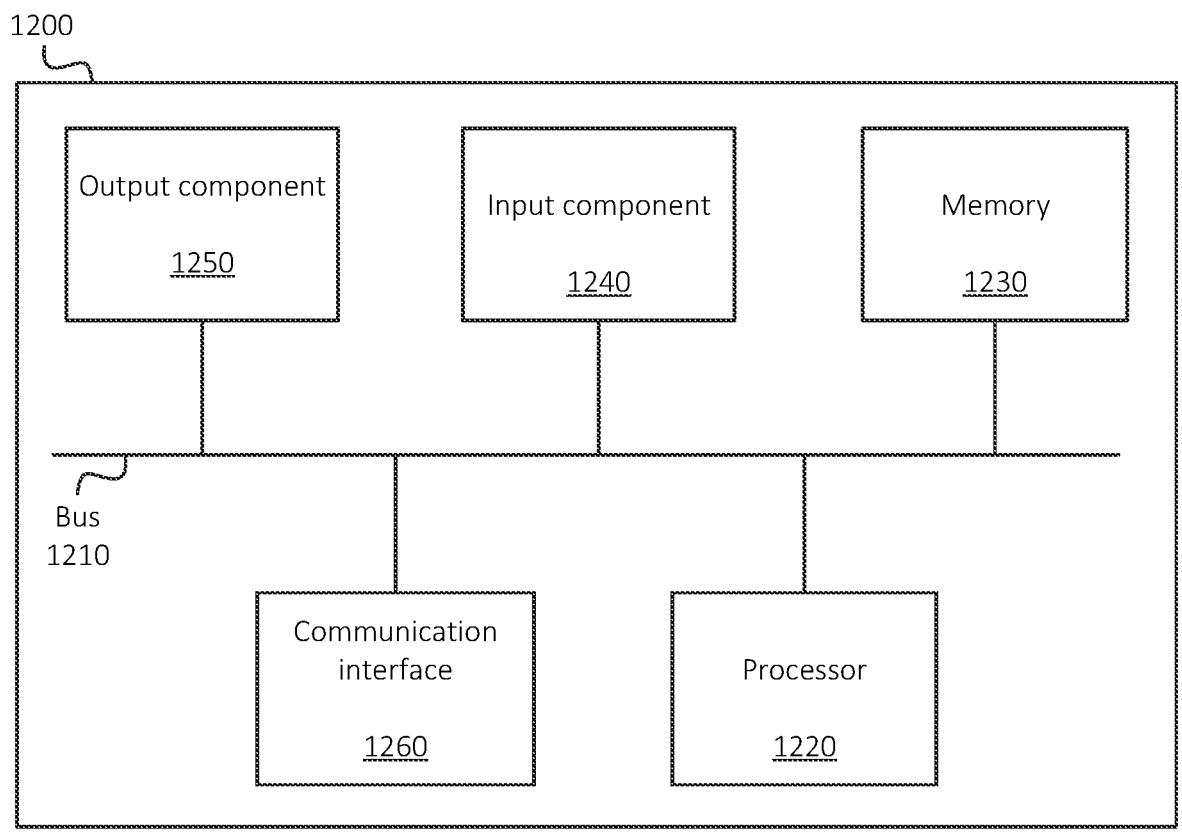
FIG. 12 illustrates example components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. In some embodiments, processor 1220 may be or may include one or more hardware processors. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200 and/or other receives or detects input from a source external to 1240, such as a touchpad, a touchscreen, a keyboard, a keypad, a button, a switch, a microphone or other audio input component, etc. In some embodiments, input component 1240 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-8), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
identify a plurality of sets of seed parameters that are each associated with a respective User Equipment ("UE") of a plurality of UEs that are associated with a particular location;
generate, based on the seed parameters for each UE, a respective set of UE usage metrics for each UE;
generate a set of aggregate UE usage metrics associated with the particular location based on the generated sets of UE usage metrics;
compare the set of aggregate UE usage metrics to a measure of network capacity associated with the particular location;
determine, based on the comparing, an amount of time that a measure of UE usage, indicated by the set of aggregate UE usage metrics, exceeds the measure of network capacity;
determine that the amount of time exceeds a threshold amount of time; and modify network configuration parameters associated with the particular location based on determining that the amount of time exceeds the threshold amount of time.

2. The device of claim 1, wherein the one or more processors are further configured to:
identify a set of labels associated with one or more UEs of the plurality of UEs; and
identify one or more respective sets of seed parameters associated with the one or more UEs based on the identified set of labels.

3. The device of claim 1, wherein generating the respective set of UE usage metrics for each UE includes performing a pseudo-random generation of the respective set of UE usage metrics for each UE based on the seed parameters for each UE.

4. The device of claim 1, wherein the set of aggregate UE usage metrics are associated with a particular duration of time, and wherein the threshold amount of time is a particular proportion of the particular duration of time.

5. The device of claim 1, wherein the particular location is associated with a coverage area of a plurality of networks that are implemented by a particular set of hardware resources, wherein the plurality of UEs are associated with a particular network of the plurality of networks, and wherein modifying the network configuration parameters include modifying network configuration parameters of the particular network.

6. The device of claim 5, wherein the particular network is a first network, wherein the plurality of networks include a second network associated with a different plurality of UEs, wherein modifying the network configuration parameters further include modifying network configuration parameters of the second network.

7. The device of claim 1, wherein the one or more processors are further configured to:
determine that the plurality of UEs will be present at the particular location during a particular timeframe,
wherein modifying the network configuration parameters includes causing one or more base stations associated with the particular location to implement the modified network configuration parameters during the particular timeframe.

8. A non-transitory computer-readable medium, storing a plurality of processor-executable instructions to:
identify a plurality of sets of seed parameters that are each associated with a respective User Equipment ("UE") of a plurality of UEs that are associated with a particular location;
generate, based on the seed parameters for each UE, a respective set of UE usage metrics for each UE;
generate a set of aggregate UE usage metrics associated with the particular location based on the generated sets of UE usage metrics;
compare the set of aggregate UE usage metrics to a measure of network capacity associated with the particular location;
determine, based on the comparing, an amount of time that a measure of UE usage, indicated by the set of aggregate UE usage metrics, exceeds the measure of network capacity;
determine that the amount of time exceeds a threshold amount of time; and
modify network configuration parameters associated with the particular location based on determining that the amount of time exceeds the threshold amount of time.

9. The non-transitory computer-readable medium of claim 8, wherein the plurality of processor-executable instructions further include processor-executable instructions to:
identify a set of labels associated with one or more UEs of the plurality of UEs; and
identify one or more respective sets of seed parameters associated with the one or more UEs based on the identified set of labels.

10. The non-transitory computer-readable medium of claim 8, wherein generating the respective set of UE usage metrics for each UE includes performing a pseudo-random generation of the respective set of UE usage metrics for each UE based on the seed parameters for each UE.

11. The non-transitory computer-readable medium of claim 8, wherein the set of aggregate UE usage metrics are associated with a particular duration of time, and wherein the threshold amount of time is a particular proportion of the particular duration of time.

12. The non-transitory computer-readable medium of claim 8, wherein the particular location is associated with a coverage area of a plurality of networks that are implemented by a particular set of hardware resources, wherein the plurality of UEs are associated with a particular network of the plurality of networks, and wherein modifying the network configuration parameters include modifying network configuration parameters of the particular network.

13. The non-transitory computer-readable medium of claim 12, wherein the particular network is a first network, wherein the plurality of networks include a second network associated with a different plurality of UEs, wherein modifying the network configuration parameters further include modifying network configuration parameters of the second network.

14. The non-transitory computer-readable medium of claim 8, wherein the plurality of processor-executable instructions further include processor-executable instructions to:
determine that the plurality of UEs will be present at the particular location during a particular timeframe,
wherein modifying the network configuration parameters includes causing one or more base stations associated with the particular location to implement the modified network configuration parameters during the particular timeframe.

15. A method, comprising:
identifying a plurality of sets of seed parameters that are each associated with a respective User Equipment ("UE") of a plurality of UEs that are associated with a particular location;
generating, based on the seed parameters for each UE, a respective set of UE usage metrics for each UE;
generating a set of aggregate UE usage metrics associated with the particular location based on the generated sets of UE usage metrics;
comparing the set of aggregate UE usage metrics to a measure of network capacity associated with the particular location;
determining, based on the comparing, an amount of time that a measure of UE usage, indicated by the set of aggregate UE usage metrics, exceeds the measure of network capacity;
determining that the amount of time exceeds a threshold amount of time; and
modifying network configuration parameters associated with the particular location based on determining that the amount of time exceeds the threshold amount of time.

16. The method of claim 15, the method further comprising:
identifying a set of labels associated with one or more UEs of the plurality of UEs; and
identifying one or more respective sets of seed parameters associated with the one or more UEs based on the identified set of labels.

17. The method of claim 15, wherein generating the respective set of UE usage metrics for each UE includes performing a pseudo-random generation of the respective set of UE usage metrics for each UE based on the seed parameters for each UE.

18. The method of claim 15, wherein the set of aggregate UE usage metrics are associated with a particular duration of time, and wherein the threshold amount of time is a particular proportion of the particular duration of time.

19. The method of claim 15, wherein the particular location is associated with a coverage area of a plurality of networks that are implemented by a particular set of hardware resources, wherein the plurality of UEs are associated with a particular network of the plurality of networks, and wherein modifying the network configuration parameters include modifying network configuration parameters of the particular network.

20. The method of claim 15, the method further comprising:
determining that the plurality of UEs will be present at the particular location during a particular timeframe,
wherein modifying the network configuration parameters includes causing one or more base stations associated with the particular location to implement the modified network configuration parameters during the particular timeframe.

* * * * *